US008879487B2

(12) United States Patent
Hariharan et al.

(10) Patent No.: US 8,879,487 B2
(45) Date of Patent: Nov. 4, 2014

(54) FEEDBACK SCHEME FOR PROVIDING FEEDBACK ON PLURAL TRANSMISSIONS

(75) Inventors: Priya Hariharan, Dallas, TX (US); Alexander Golitschek Edler Von Elbwart, Darmstadt (DE); Christian Wengerter, Kleinheubach (DE); Seigo Nakao, Kanagawa (JP); Joachim Löhr, Wiesbaden (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 65 days.

(21) Appl. No.: 13/393,099

(22) PCT Filed: May 11, 2010

(86) PCT No.: PCT/EP2010/002903
§ 371 (c)(1),
(2), (4) Date: Apr. 9, 2012

(87) PCT Pub. No.: WO2011/026534
PCT Pub. Date: Mar. 10, 2011

(65) Prior Publication Data
US 2012/0182914 A1    Jul. 19, 2012

(30) Foreign Application Priority Data

Sep. 3, 2009   (EP) .................................. 09169367
Sep. 29, 2009  (EP) .................................. 09012332

(51) Int. Cl.
*H04W 4/00* (2009.01)
*H04L 1/18* (2006.01)
*H04L 1/16* (2006.01)
*H04L 27/26* (2006.01)

(52) U.S. Cl.
CPC ............ *H04L 1/1893* (2013.01); *H04L 1/1858* (2013.01); *H04L 1/1614* (2013.01); *H04L 1/1812* (2013.01); *H04L 1/1621* (2013.01); *H04L 27/2601* (2013.01); *H04L 1/189* (2013.01)
USPC ....................................................... 370/329

(58) Field of Classification Search
None
See application file for complete search history.

(56) References Cited

U.S. PATENT DOCUMENTS

2008/0267158 A1 * 10/2008 Zhang et al. .................. 370/342
2009/0113268 A1    4/2009 Vihriala
2009/0201869 A1    8/2009 Xu
2009/0279460 A1 * 11/2009 Sarkar .......................... 370/280

FOREIGN PATENT DOCUMENTS

WO    2008/024890    2/2008
WO    2008/041932    4/2008

(Continued)

OTHER PUBLICATIONS

European Search Report dated Aug. 11, 2010.

(Continued)

*Primary Examiner* — Minh-Trang Nguyen
(74) *Attorney, Agent, or Firm* — Dickinson Wright PLLC

(57) ABSTRACT

The invention relates to methods and apparatuses for providing HARQ feedback in a mobile communication system using carrier aggregation. To suggest a scheme for transmitting feedback on the successful/unsuccessful decoding of transmissions that is operable in FDD mode, the invention proposes to utilize only a single one of plural radio resources available for feedback transmission for signaling feedback for multiple transmissions. A feedback sequence of ACK/NACKs for the transmissions is mapped to one feedback resource combination that is one of the radio resources available for feedback transmission and a modulation symbol of the given modulation scheme that is transmitted on said one radio resource. This scheme can also be used in cases where the number of possible feedback sequences of ACK/NACKs for the transmissions is larger than the number of feedback resource combinations available for feedback transmission.

21 Claims, 6 Drawing Sheets

(56) References Cited

FOREIGN PATENT DOCUMENTS

| WO | 2008/127184 | 10/2008 |
| WO | 2009/020983 | 2/2009 |
| WO | 2009/044367 | 4/2009 |
| WO | 2009/100220 | 8/2009 |

OTHER PUBLICATIONS

Japanese Notice of Reasons for Rejection dated Mar. 11, 2014 with English translation.

* cited by examiner

FEEDBACK SCHEME FOR PROVIDING FEEDBACK ON PLURAL TRANSMISSIONS

FIELD OF THE INVENTION

The invention relates to methods for providing feedback, such as HARQ feedback, in a mobile communication system. Furthermore, the invention also proves hardware structures, such as a transmitting apparatus and a receiving apparatus, that perform the method, as well as a software based implementation of the methods proposed herein.

TECHNICAL BACKGROUND

Long Term Evolution (LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). 3GPP LTE is designed to meet the carrier needs for high speed data and media transport as well as high capacity voice support to the next decade. The ability to provide high bit rates is a key measure for LTE. The Work Item (WI) specification on LTE called Evolved UMTS Terrestrial Radio Access (UTRA) and UMTS Terrestrial Radio Access Network (UTRAN) is to be finalized as Release 8. The 3GPP LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

In 3GPP LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in 3GPP LTE (Release 8).

Physical Downlink Control Channel (PDCCH) Assignment

The physical downlink control channel (PDCCH) carries scheduling grants for allocating resources for downlink or uplink data transmission. Each scheduling grant is defined based on Control Channel Elements (CCEs). Each CCE corresponds to a set of Resource Elements (REs). In 3GPP LTE, one CCE consists of nine Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCEs, where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, a PDCCH can aggregate 1, 2, 4 or 8 CCEs. The number of CCEs available for control channel assignment is a function of several factors, including carrier bandwidth, number of transmit antennas, number of OFDM symbols used for control and the CCE size. Multiple PDCCHs can be transmitted in a sub-frame.

On a transport channel level, the information transmitted via the PDCCH is also refereed as L1/L2 control signaling. L1/L2 control signaling is transmitted in the downlink for each user equipment (UE). The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length (in the time domain) is equivalent to either one or multiple sub-frames. The TTI length may be fixed in a service area for all users, may be different for different users, or may even by dynamic for each user. Generally, then the L1/2 control signaling needs only be transmitted once per TTI.

Furthermore, the PDCCH information sent on the L1/L2 control signaling may be separated into the Shared Control Information (SCI) and Dedicated Control Information (DCI).

For further information on the LTE physical channel structure in downlink and the PDSCH and PDCCH format, see St. Sesia et al., "LTE—The UMTS Long Term Evolution", Wiley & Sons Ltd., ISBN 978-0-47069716-0, April 2009, sections 6 and 9.

Physical Uplink Control Channel (PUCCH)

The physical uplink control channel (PUCCH) carries uplink control information. A user equipment never transmits the PUCCH and data on the physical uplink shared channel (PUSCH) simultaneously in uplink. In case of simultaneous transmission of control and data, a user equipment multiplexes control data with user data and transmits the multiplexed data on the PUSCH. The uplink control information may contain:

Uplink acknowledgement (UL ACK/NACK) of downlink transport blocks.
   Channel Quality Information (CQI) reporting for efficient downlink data transmissions.
   Scheduling Request (SR) for uplink data transmission from the user equipment that is signaled to an eNode B.

For further information on the LTE physical channel structure in uplink and the PUCCH format, see St. Sesia et al. sections 15 and 17.

3GPP LTE-A—Further Advancements for 3GPP LTE

The frequency spectrum for IMT-Advanced was decided at the World Radio Communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd. Generation Partnership Project (3GPP). At the 3GPP TSG RAN 39 meeting, the Study Item (SI) description on "Further Advancements for E-UTRA (LTE-Advanced)" was approved which is also referred to as "Release 10". The study item covers technology components to be considered for the evolution of E-UTRA, e.g. to fulfill the requirements of IMT-Advanced. Two major technology components which are currently under consideration for LTE-A are described in the following.

In order to extend the overall system bandwidth, LTE-A (Release 10) uses carrier aggregation, where two or more component carriers are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:

An LTE-Advanced=LTE-A (Release 10) compatible mobile terminal (user equipment) with reception and/or transmission capabilities for carrier aggregation can simultaneously receive and/or transmit on multiple component carriers. There is one Transport Block (in absence of spatial multiplexing) and one HARQ entity per component carrier.

An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A component carriers is not precluded.
Uplink Acknowledgment Transmission for 3GPP LTE-A Uplink ACK/NACK transmission should be designed to support both symmetric and asymmetric carrier aggregation. Please note that ACK is a positive acknowledgment and is acknowledging successful decoding of a transmission/transport block, while NACK is a negative acknowledgement that indicates unsuccessful decoding of a transmission/transport block The baseline assumption for downlink component carrier assignment is one transport block (in the absence of spatial multiplexing) and HARQ entity per scheduled component carrier. Thus in case of a multiple component carrier assignment, the may have multiple HARQ processes in parallel. This means that multiple ACK/NACKs corresponding to the downlink component carrier be transmitted in the uplink, unlike 3GPP LTE where a single ACK/NACK report is transmitted in uplink. Further, in 3GPP LTE-A there is the possibility that control and data channels are transmitted simultaneously within a single sub-frames of the component carriers. To acknowledge the received downlink transport block(s) different uplink transmission schemes are presently considered in the discussions of the 3GPP.

An ACK/NACK is sent by the user equipment for each downlink transport block. The transmission of multiple ACK/NACKs is generally preferable for with no power limitation. Furthermore, transmitting a separate ACK/NACK for each transport block has the advantage that the transport blocks are uncorrelated. This means that transport blocks can be (re-) transmitted independently of each other allows for use of an individual HARQ process for each transport block.

So far no satisfying uplink transmission scheme for ACK/NACKs has been proposed for 3GPP LTE-A.

SUMMARY OF THE INVENTION

One object of the invention is to suggest a scheme for transmitting feedback on the successful/unsuccessful decoding of transmissions. Advantageously, this feedback scheme should be operable in a communication system operated in a Frequency Division Multiplex (FDD) mode with a low order modulation scheme and comparably low transmit power.

The object is solved by the subject matter of the independent claims. Advantageous embodiments of the invention are subject to the dependent claims.

One aspect of the invention is to effectively utilize the number of radio resources available for feedback transmission and the number of information bits i.e. ACK/NACKs that can be signaled using a given modulation scheme. Accordingly, only one of the radio resources available for feedback transmission is used for signaling feedback for multiple transmissions. A feedback sequence of ACK/NACKs for the transmissions is mapped to one feedback resource combination that is one of the radio resources available for feedback transmission and a modulation symbol of the given modulation scheme that is transmitted on said one radio resource.

A further second aspect of the invention is related to further improving the feedback signaling scheme according to the first aspect for cases where the number of possible feedback sequences of ACK/NACKs for the transmissions is larger than the number of feedback resource combinations available for feedback transmission. In these cases the plural feedback sequences are mapped to a single feedback resource combination. Hence, feedback on at least one of the transmissions may no longer be determined by the entity receiving a feedback resource combination which cannot be unambiguously mapped to a corresponding single feedback resource sequence.

In line with these aspects of the invention, one embodiment of the invention is providing a method for transmitting by a receiving apparatus (e.g. a user equipment/eNode B) feedback on plural transmissions to a transmitting apparatus (e.g. an eNode B/user equipment). In this method, the receiving apparatus receives receiving the plural transmissions from the transmitting apparatus, and determines for each transmission of the received plural transmissions, whether the respective transmission could be decoded successfully. The receiving apparatus is thereby generating a feedback sequence of ACK/NACKs for the plural transmissions which is subsequently transmitted on its corresponding feedback resource combination. This corresponding feedback resource combination is determined from plural feedback resource combinations, wherein the feedback resource combinations define distinct combinations of:

one of a plurality of reverse link radio resources available for transmitting the feedback sequence, and a modulation symbol of a modulation scheme to be transmitted on the one reverse link radio resource.

In one exemplary implementation, the reverse link radio resources are all part of a single sub-frame on the reverse link or define reverse link resources within a single transmission time interval. Moreover, in a further embodiment of the invention, the transmission are (also) transmitted within a single sub-frame or transmission time interval from the transmitting apparatus to the receiving apparatus, e.g. on respective component carriers.

In line with the second aspect of the invention, the number of possible feedback sequences of ACK/NACKs for the plural transmissions can be larger than the number of feedback resource combinations available for feedback transmission. In other words, this implies that, for one or more of the available feedback resource combinations, plural feedback sequences are mapped to same feedback resource combination at the receiving apparatus, such that the transmitting apparatus cannot determine reliable feedback from the received feedback resource combination when same could be corresponding to more than one feedback sequence.

In one exemplary embodiment of this invention, the feedback mapping rule is designed such that it considers the probability of a given number of positive acknowledgements ACKs occurring in a feedback sequence. Optionally, or alternatively, the feedback mapping rule may consider the probability of a scheduler scheduling a given number of transmissions within a sub-frame. Optionally, or alternatively to the previous criteria, the feedback mapping rule may be designed so as to reduce the number of unnecessary retransmissions caused by ambiguous feedback (i.e. by signaling a feedback resource combination associated to a feedback sequence combination) to a minimum.

Unnecessary retransmissions means in this context that in case a transmitting apparatus is receiving a feedback resource combination providing feedback that is associated to plural feedback sequences (i.e. to a feedback sequence combination), the number of positive ambiguous acknowledgments within these feedback sequences should be minimized. Hence, if the number of unreliably detected positive acknowledgements, i.e. of positive acknowledgments that need to be interpreted as a negative acknowledgement due to the position within the feedback sequence carrying the positive acknowledgements being unreliable, is minimized within the feedback sequence combinations, also the number of unnecessary retransmissions of an acknowledged packet caused by the ambiguous feedback of the feedback sequence combinations can be minimized.

In a variation of this embodiment, it can be assumed that the possible feedback sequences of ACK/NACKs are grouped into feedback sequence groups. Each feedback sequence group consists of feedback sequences having a given number of positive (and negative) acknowledgements occurring in a feedback sequence. According to the feedback mapping rule only feedback sequences of selected one or more feedback sequence groups are mapped to the feedback sequence combinations. Hence, the feedback sequences of the other remaining sequence group(s) may be mapped to feedback resource combinations in a 1-to-1 manner.

In order to optimize the performance of the feedback mapping rule, it may be for example foreseen that these only feedback sequences of said selected one or more feedback sequence groups are mapped to the feedback sequence combinations such that the number of ambiguous ACK/NACKs per feedback resource combination is minimized. In addition or alternatively thereto, only feedback sequences of said selected one or more feedback sequence groups may be mapped to the feedback sequence combinations such that the total number of ambiguous ACK/NACKs of all feedback resource combinations defined by the feedback mapping rule is minimized.

Alternatively thereto, feedback sequences of said selected one or more feedback sequence groups are mapped to the feedback sequence combinations such that the number of unnecessary retransmissions caused by signaling feedback resource combinations associated to feedback sequence combinations is minimized. In addition, or alternatively, the feedback sequences of the selected one or more feedback sequence groups are mapped to the feedback sequence combinations such that the number of unnecessary retransmissions implied by the feedback sequence combinations of all feedback resource combinations defined by the feedback mapping rule is minimized.

In another embodiment of the invention, the feedback sequence comprising only negative acknowledgements ("all NACKs") and/or the feedback sequences comprising only one positive acknowledgement is/are unambiguously mapped to respective feedback resource combinations. For example, those feedback sequences are not mapped to feedback sequence combinations, but reliable feedback is provided for these sequences.

In another embodiment of the invention, one feedback sequence combination consists of the feedback sequence comprising only negative acknowledgements and the feedback sequences comprising only one positive acknowledgement.

In a further exemplary embodiment, when forming feedback sequence combinations, feedback sequences of all but one feedback sequence combinations differ from each other in a maximum of two positions for a given feedback sequence combination.

In a further embodiment of the invention, the feedback sequences of each feedback sequence combination differ from each other in a maximum of two positions.

In one further enhanced embodiment of the invention, a feedback mapping rule is used for defining the mapping of each feedback sequence of ACK/NACKs possible for the plural transmissions to its corresponding feedback resource combination. This feedback mapping rule is know to the transmitting apparatus and the receiving apparatus. If the number of possible feedback sequences of ACK/NACKs for the plural transmissions can is larger than the number of feedback resource combinations available for feedback transmission, the feedback mapping rule defines feedback sequence combinations consisting each of at least two (for example a pair of) feedback sequences of ACK/NACKs.

The feedback sequences belonging to one feedback sequence combination should preferable deviate from each other in one as few positions of the sequence as possible, so that the number of unreliable ACK/NACKs for the respective transmission is minimized. In one example, the feedback sequences of feedback resource combination have a Hamming distance of one to each other. In another example, they have a Hamming distance of two to each other. Each respective feedback sequence combination is mapped to respective mutually different ones of the feedback resource combinations.

In one exemplary implementation, each of the feedback sequence combinations consist of a pair of feedback sequences of ACK/NACKs having a Hamming distance of one to each other. Let there be M different modulation symbols corresponding to the modulation scheme for feedback transmission, $N_f$ forward link radio resources on which the plural transmissions are received respectively, and $N_r$ reverse link radio resources available for transmitting the feedback sequence. In this example, the feedback mapping rule defines I feedback sequence combinations, where $I=2^{N_f}-2^{log_2 M} \cdot N_r$ and where $N_f \geq N_r$.

One can further assume that each feedback sequence has $N_f$ positions corresponding each to a respective forward link resource on which a transmission has been received, and—according to the mapping rule—the feedback sequences mapped to the same modulation symbol are deviating from each other in the same $\lceil I/M \rceil$ positions.

In a further variation, according to the mapping rule, the feedback sequences mapped to the same modulation symbol may be identical in $N_f-\lceil I/M \rceil$ positions of the feedback sequences for each respective modulation symbol. Alternatively, according to the mapping rule, the feedback sequences mapped to the same reverse link radio resource are identical in $N_f-\lceil I/M \rceil$ positions of the feedback sequences for each respective modulation symbol. Hence, it is possible to make some feedback information on one or more transmission inherent to the modulation symbol and/or reverse link radio resource of the feedback resource combinations. This enables the transmitting apparatus to for example detect reliable feedback on at least one of the transmissions from the reverse link radio resource on which the feedback is received, even if the modulation symbol thereon cannot be detected reliably.

Feedback on successful or unsuccessful decoding of a respective one of the transmissions is provided at a given position within the feedback sequences. In another exemplary embodiment of the invention, the individual positions in which the individual feedback sequences of the feedback sequence combinations deviate from each other are (approximately) evenly/uniformly distributed across the transmissions.

In a further exemplary embodiment of the invention, an integer number R of the plural transmissions are selected on which unambiguous feedback is to be provided. The feedback sequences of the respective feedback sequence combinations defined according to the feedback mapping rule do not deviate from each other in the position(s) of the feedback sequences corresponding to the R reliable transmissions. Assuming that feedback on successful or unsuccessful decoding of a respective one of the transmissions is provided within information at given position within the feedback sequences, it may be further desirable that the positions in which the individual feedback sequences of the feedback sequence combinations deviate from each other are approximately evenly/uniformly distributed across the transmissions on which no unambiguous feedback is to be provided.

In another embodiment of the invention, it is further assumed that transmissions received on forward link resource are corresponding to one of the remaining $N_f - \lceil I/M \rceil$ positions within the feedback sequences, respectively the R reliable transmission(s) is/are carrying data of a service requiring reliable transmission of service data or low delay in the transmission of the service data. Hence, the different levels of reliability of the feedback for individual transmission may also be considered in mapping service data of a user to the different transmissions, respectively component carriers. It may be further assumed that $0 < R < \lceil I/M \rceil$ for these cases.

Another embodiment of the invention is related to the definition of the feedback mapping rule such that for at least one of the component carriers on which the transmissions are received, the feedback resource combinations having a reverse link radio resource yielded by one of said at least one component carriers, have only feedback sequences that acknowledge successful decoding of the transmission on said one of said at least one component carriers.

Another embodiment of the invention is providing a method for receiving by a transmitting apparatus feedback on plural transmissions from a receiving apparatus. In this method, the transmitting apparatus is transmitting the plural transmissions on plural forward link radio resources to the receiving apparatus, and is determining on which one of plural feedback resource combinations feedback on the transmissions is provided from the receiving apparatus. As mentioned earlier, the feedback resource combinations are distinct combinations of:

one of plural reverse link radio resources available for receiving feedback on the transmissions from the receiving apparatus, and
one modulation symbol of a modulation scheme received on the one reverse link radio resource, and Furthermore, the transmitting apparatus is mapping the detected feedback resource combination to a corresponding feedback sequence of ACK/NACKs indicating which of the transmissions could be decoded successfully.

Also in this method, the number of feedback resource combinations available for feedback transmission may be smaller than number of possible feedback sequences of ACK/NACKs for the plural transmissions. If so, there may be a feedback resource combination detected at the transmitting apparatus that can not be unambiguously mapped to a corresponding feedback sequence of ACK/NACKs. As a result, for (at least) one single transmission of the transmissions no feedback on its successful decoding can be determined by the transmitting apparatus. The transmitting apparatus may optionally further transmit a retransmission for the (at least) one single transmission for which no feedback on its successful decoding could be determined by the transmitting apparatus. Moreover, the transmitting apparatus could further transmit a retransmission for those transmissions that are indicated as not having been decoded successfully by the receiving apparatus within the feedback sequence of ACK/NACKs.

The first and second aspect of the invention may be further enhanced with a mechanism for reporting discontinuous transmission(s). According to a further embodiment of the invention at least one of the feedback resource combinations is reserved for signaling from the receiving apparatus to the transmitting apparatus that no control signaling for at least one but not all of the transmissions—if no control signaling is received at all, there may no reverse link radio resource for the feedback be derived from the control signaling—has been received, so that the respective transmission(s) have not been received by the receiving apparatus due to same assuming a discontinuous transmission (DTX).

Generally, the first and second aspect of the invention and the different embodiments thereof described herein may be applied to downlink transmission in a 3GPP LTE-A system operated in FDD mode where multiple component carriers are aggregated. Accordingly, the transmissions may be received or transmitted on forward link (downlink) radio resources that are radio resources on a physical downlink shared channel (PDSCH). Similarly, the reverse link radio resources could be radio resources on a physical uplink shared channel (PUSCH) of a 3GPP-based communication system. The forward link radio resources could therefore be radio resources of one or more component carriers.

Depending on whether the transmissions are in downlink or uplink, the transmitting apparatus could be an eNodeB, while the receiving apparatus could be a user equipment, or vice versa.

Moreover, the transmissions may consist of transport blocks (in most scenarios it is assumed that there is one transport block per transmission or component carrier) and the transmissions could be for example transmitted using a Hybrid ARQ protocol. In this respect it should be noted that in most cases discussed herein there is a one-to-one correspondence between transmission and component carriers assumed for exemplary purposes.

Furthermore, other embodiments of the invention relate to the implementation of the first and second aspect of this invention in hardware and/or software (e.g. software modules). Another embodiment of the invention is therefore providing a receiving apparatus (e.g. a user equipment or mobile terminal) for providing by feedback on plural transmissions to a transmitter. The receiving apparatus comprises for instance a receiver for receiving the plural transmissions from the transmitter, and a processing unit for determining for each transmission of the received plural transmissions, whether the respective transmission could be decoded successfully, thereby generating a feedback sequence of ACK/NACKs for the plural transmissions. Furthermore the receiving apparatus comprises a transmitter for transmitting the feedback sequence on its corresponding feedback resource combination determined from plural feedback resource combinations.

The receiving apparatus may further comprise a decoder for decoding each transmission of the received plural transmissions and for outputting a decoding result and/or a modulator for providing the modulation symbol to be transmitted on the reverse link radio resource of the feedback resource combination corresponding to the feedback sequence.

A further embodiment of the invention is providing a transmitting apparatus for receiving feedback on plural transmissions from a receiving apparatus. This transmitting apparatus comprises a transmitter for transmitting the plural transmissions on plural forward link radio resources to the receiving apparatus, and a processing unit for determining on which one of plural feedback resource combinations feedback on the transmissions is provided from the receiving apparatus. Moreover, the transmitting apparatus comprises a mapping unit for mapping the detected feedback resource combination to a corresponding feedback sequence of ACK/NACKs indicating which of the transmissions could be decoded successfully.

The transmitting apparatus could also further comprise a receiver for monitoring the reverse link radio resources available for receiving feedback on the transmissions from the receiving apparatus and for receiving a modulation symbol on one of the plural reverse link radio resources, and a demodulator for detecting the modulation symbol.

The transmitting apparatus and/or the receiving apparatus may also comprise a memory for storing a feedback mapping rule that defines the mapping of each feedback sequence of ACK/NACKs possible for the plural transmissions to its corresponding feedback resource combination.

Another embodiment of the invention provides a computer readable medium storing instructions that, when executed by a processor of a receiving apparatus, cause the receiving apparatus to provide feedback on plural transmissions to a transmitting apparatus, by receiving the plural transmissions from the transmitting apparatus, determining for each transmission of the received plural transmissions, whether the respective transmission could be decoded successfully, thereby generating a feedback sequence of ACK/NACKs for the plural transmissions, and transmitting the feedback sequence on its corresponding feedback resource combination determined from plural feedback resource combinations.

A further embodiment of the invention is related to a computer readable medium storing instructions that, when executed by a processor of a transmitting apparatus, cause the transmitting apparatus to receive feedback on plural transmissions from a receiving apparatus, by transmitting the plural transmissions on plural forward link radio resources to the receiving apparatus, determining on which one of plural feedback resource combinations feedback on the transmissions is received from the receiving apparatus, and mapping the detected feedback resource combination to a corresponding feedback sequence of ACK/NACKs indicating which of the transmissions could be decoded successfully.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network. Nevertheless, the improvements to the random access procedure proposed herein may be readily applied in the architectures/systems described in the Technical Background section and may in some embodiments of the invention also make use of standard and improved procedures of theses architectures/systems.

Figure 1:
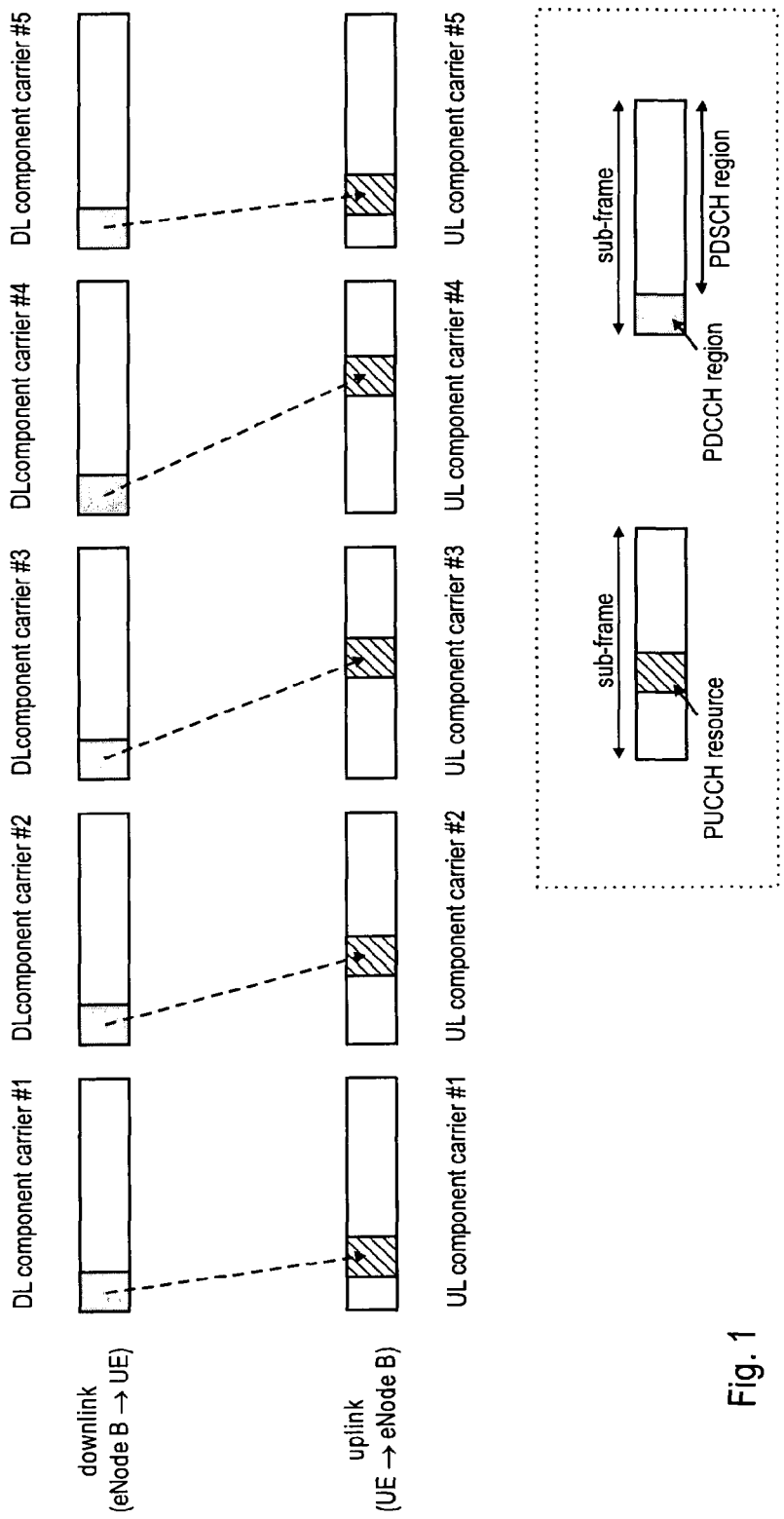
FIG. 1 shows an example, for reusing the HARQ feedback scheme as defined for 3GPP LTE five times within a 3GPP LTE-A system, where five component carriers are aggregated.

FIG. 1 exemplarily shows five downlink (DL) component carriers within a sub-frame that are assumed to carry a respective downlink transmission for a user equipment in its PDSCH region, and the L1/L2 control information related to the downlink transmission in the sub-frame within the PDCCH region. As will be outlined below in further detail, the resources (CCEs) of the PDCCH region on which the L1/L1 control signaling is sent for the respective transmissions on the sub-frame is linked (e.g. by some formula) to a corresponding PUCCH resource in uplink for the HARQ feedback for a respective transmission on the downlink component carriers. Simply reusing the LTE feedback signaling scheme for HARQ feedback would mean that there is a respective ACK/NACK sent for each downlink transmission on the corresponding PUCCH resource on a respective uplink (UL) component carrier. Alternatively all PDCCHs may be located on a single component carrier to indicate the locations within the PDSCH region of each of the five component carriers on which respective transmissions for the user equipment are located. In other words, the possibility that a PDCCH on one component carrier may indicates a transmission within the PDSCH region of another component carrier is not precluded.

Generally, it can be assumed that in a mobile communication system using component carrier aggregation where n component carriers are aggregated, like 3GPP LTE-A, it is undesirable from a control signaling overhead point of view to simple reuse n times the feedback scheme defined for the single component carrier case. Hence, the feedback overhead of a feedback scheme for HARQ for use in a mobile communication system using carrier aggregation should not scale linearly with the number of component carriers.

One aspect of the invention is to effectively utilize the number of radio resources available for feedback transmission and the number of information bits (i.e. ACK/NACKs that can be signaled using a given modulation scheme. As will be discussed below, according to this first aspect of the invention, only one of the radio resources available for feedback transmission is used for signaling feedback for multiple transmissions. Generally, one can assume that there is a certain number $N_r$ of reverse link radio resources for feedback provision available to the entity sending the feedback, and that the modulation scheme for transmitting the feedback on these radio resources is allowing to signal $\log_2 M$ bits (i.e. ACK/NACKs)—or in other words, M different modulation symbols can be signaled on a respective one of the $N_r$ radio resources for the feedback.

In order to reduce the signaling overhead, only one of the $N_r$ radio resources will be utilized for providing feedback. This implies that a total of $M \cdot N_r$ different "states" can be signaled. Furthermore, a combination of one of a plurality of reverse link radio resources available for transmitting the feedback, and one modulation symbol of a modulation scheme to be transmitted on said one reverse link radio resource can be defined as a feedback resource combination. Hence, there are $M \cdot N_r$ different feedback resource combinations.

Figure 3:
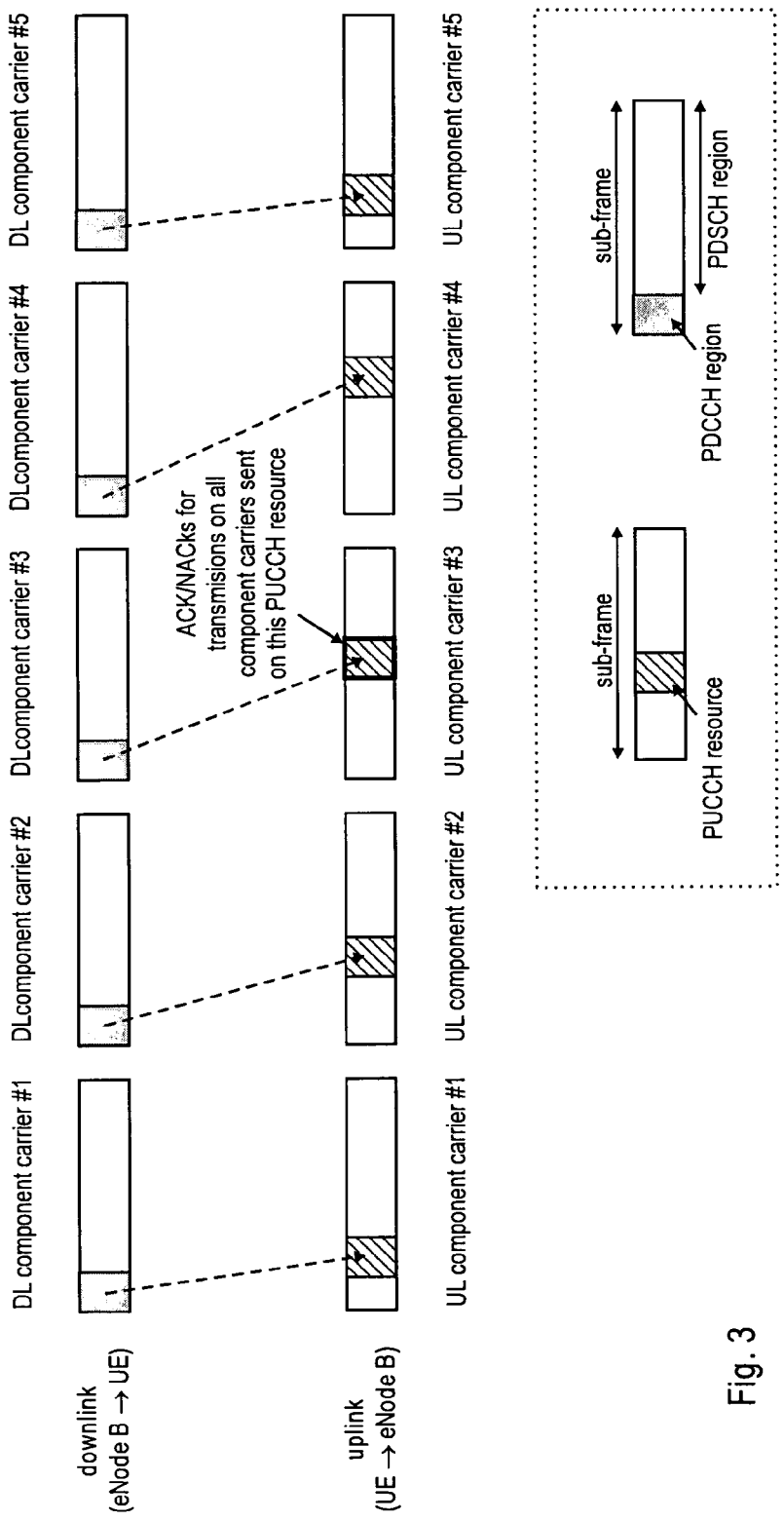
FIG. 3 shows an exemplary embodiment of the first (and second aspect) of the invention implemented in a 3GPP LTE-A system, where five component carriers are aggregated.

FIG. 3 shows an exemplary embodiment of the first aspect of the invention. Similar to FIG. 1, a 3GPP LTE-A system with five component carriers in uplink and downlink direction is assumed. Similar to FIG. 1, each of the PDCCHs accompanying a downlink transmission on a respective DL component carrier is still yielding a corresponding uplink resource for feedback provision (PUCCH) on an UL component carrier. However, instead on sending feedback for each transmissions a respective ACK/NACK on the PUCCH resource yielded by the PDCCH of the respective transmission, according to the first aspect of the invention, there is only one modulation symbol sent on one of the five available PUCCH resources for feedback transmission to provide feedback (ACK/NACKs) for all five downlink transmissions.

Assuming that there are at least as many transmissions (e.g. transport blocks) within a sub-frame or transmission time interval—let the number of transmissions on the forward link be $N_f$—as there are radio resources for feedback transmission available, i.e. $N_f \geq N_r$, each transmission of the forward link transmission (within a sub-frame or transmission time interval) is requiring one bit (i.e. one ACK/NACK) for feedback signaling. Given $N_f$ transmissions in a sub-frame or transmission time interval, the feedback (ACK/NACK)—indicating whether the respective transmission has been decoded successfully—for the different transmissions can be assumed to form a feedback sequence of $N_f$ bits, wherein each bit/position in this feedback sequence is linked to one of the transmissions, i.e. is indicating the feedback (ACK/NACK) for a given transmission. Hence, for $N_f$ transmissions on the forward link, there exist $2^{N_f}$ different ACK/NACK combinations, respectively feedback sequences.

Hence as long as the relation:

$$2^{N_f} \leq M \cdot N_r \qquad \text{Equation 1}$$

is fulfilled, it is possible to signal feedback for all $N_f$ transmissions on one single reverse link radio resource using a modulation scheme allowing to signal $\log_2 M$ bits (i.e. ACK/NACKs) or, in other words, having M different modulation symbols.

Please note that the term "forward link" used herein defines direction from the transmitting apparatus of the $N_f$ transmissions (e.g. an eNode B or user equipment, respectively) to a receiving apparatus (e.g. a user equipment or eNode B, respectively) while the term "reverse link" defines the direction from receiving apparatus to transmitting apparatus, where inter alia the feedback sequence for the transmissions on the forward link is to be sent. Hence, the term "forward link" refers either to what is commonly known as "downlink" or "uplink", respectively, whereas the term "reverse link" refers to either to what is commonly known as "uplink" or "downlink", respectively.

Considering a 3GPP LTE-A system operated in FDD mode, it can assume for exemplary purposes that the number of forward link transmissions on the physical downlink shared channel (PDSCH) yields a corresponding number of reverse link radio resources on the physical uplink control channel (PUCCH) for ACK/NACK signaling. Hence, in this case $N_f = N_r = N$.

The table below illustrates the results of Equation 1 defined above in relation to number $N_f$ of forward link transmissions given a QPSK (Quadrature Phase Shift Keying) modulation scheme, i.e. M=4. For 3GPP LTE-A it can be assumed that the number $N_f$ of forward link transmissions (transport blocks) is equal to the number of component carriers, if one transport block per component carrier is transmitted.

TABLE 1

| N (number of component carriers, respectively transport blocks) | $2^N$ (number of possible ACK/NACK combinations) | M · N (number of feedback resource combinations available) |
|---|---|---|
| 1 | 2 | 4 |
| 2 | 4 | 8 |
| 3 | 8 | 12 |
| 4 | 16 | 16 |
| 5 | 32 | 20 |

As can be seen in Table 1, the above outlined feedback scheme for signaling HARQ feedback in a 3GPP LTE-A system would be applicable as long as there are not five component carriers available. Furthermore, one should also not that it is also likely that there are asymmetric configurations of downlink component carriers and uplink component carriers, where there are more downlink component carriers (and thus downlink transmissions) than uplink component carriers (and thus feedback resources on PUCCH). For example, assume that there is always one uplink component carrier less than there are downlink component carriers, the proposed feedback scheme above only works for configurations of two and three component carriers in the downlink as can be seen in Table 2.

TABLE 2

| N (number of component carriers, respectively transport blocks) | $2^N$ (number of possible ACK/NACK combinations) | M · (N − 1) (number of feedback resource combinations available) |
|---|---|---|
| 2 | 4 | 4 |
| 3 | 8 | 8 |
| 4 | 16 | 12 |
| 5 | 32 | 16 |

In this connection, one solution for improving the feedback scheme above for a 3GPP LTE-A system where carrier aggregation is utilized, to transmit multiple ACK/NACKs for transmissions in the uplink is by increasing the number of information bits that can be transmitted by a modulation symbol from two bits, as in 3GPP LTE, to three bits. Hence, instead of using QPSK for the HARQ feedback, 8PSK (8 Phase Shift Keying) could be employed which allows to distinguish 8 different states equivalent to three information bits. Exemplarily assuming that there are five transmissions (transport blocks) have been transmitted on a corresponding number of component carriers in the downlink, this would yield that there are also five available PUCCH resources available for feedback provision (please note that each PDCCH for a transport block in the downlink is linked to a corresponding PUCCH resource in the uplink for the transmission of HARQ feedback for the transport block). Given that there a five PUCCH resources available for feedback and the modulation scheme is 8PSK, this allows to signal $2^{(3bits)} \cdot 5 = 40$ combinations in the uplink (i.e. 40 different states respectively feedback sequences can be signaled).

An ACK/NACK for a transport block can be assumed to be 1 bit in size. The total number of ACK/NACK combinations (feedback sequence) that exist (i.e. that are possible) for the exemplary five downlink transmissions is thus $2^5=32$. Hence, the 40 combinations/state that can be indicated using the 8QPSK and one of five PUCCH resources are sufficient to signal all possible 32 combinations of ACK/NACKs for the five downlink transport blocks in this exemplary solution. However, this solution uses in higher order modulation (8PSK) which means a reduction of the ACK/NACK reliability (given a constant transmit power in comparison to QPSK). To obtain a more reliable ACK/NACK transmission using 8PSK the user equipment would have to use higher transmit power (in comparison to a corresponding level of reliability provided by QPSK) to transmit the ACK/NACKs in the uplink.

Another second possible solution for improving the above discussed feedback scheme for use in a 3GPP LTE-A system operated in FDD mode, is to increase the number of available PUCCH resources, i.e. there are more PUCCH resources than downlink transport blocks, so that more states can be signaled. For example, the number of PUCCH resources could be increased from five to eight resources. Assuming further a QPSK modulation for the HARQ feedback, 2 bits can be signaled using a modulation symbol, so that a total of $2^{(2bits)} \cdot 8=32$ states can be signaled when using eight PUCCH resources. Since the number of possible ACK/NACK combinations for five transport blocks is also 32, the number of possible ACK/NACK combinations is matching the number of possible states that can be signaled using QPSK and eight PUCCH resources. This second solution, however, results in higher PUCCH overhead due to additionally reserving three PUCCH resources. Since the eNodeB can be assumed to perform a blind detection on all PUCCH resources reserved for HARQ feedback provision of a user equipment, this solution would also results in additional blind detections by the eNode B. Due to an increased number of blind detections, the ACK/NACK reliability is further lowered. Moreover, unlike 3GPP LTE, where each PUCCH resource is always linked to the index of 1$^{st}$ CCE of the one or more CCEs of the PDCCH carrying the L1/L2 control signaling for the transport block, the new methods required to derive the additional three PUCCH resources, example by higher layer signaling to signal the resources or by other implicit methods A further second aspect of the invention is related to further improving the feedback signaling scheme according to the first aspect discussed above for cases where Equation 1 is not true, i.e. for cases where the number of possible feedback sequences of ACK/NACKs for the transmissions is larger than the number of feedback resource combinations available for feedback transmission. According to this second aspect, the potential drawbacks of the two solutions discussed above can be overcome, by accepting the lesser disadvantage of reducing the reliability of feedback for individual transmissions. This potential disadvantage of the feedback scheme according to the second aspect of the invention is far outweighed by the advantages of the proposed feedback scheme according to the second aspect, in particular the simple and backward compatible design thereof. The proposed scheme is beneficial in case of system specific asymmetric carrier aggregation i.e. where the overall number of downlink component carriers is less than overall number of uplink component carriers. In such a scenario even if the user equipment is configured with a symmetric carrier aggregation (could also be asymmetric), the overall uplink feedback overhead is larger due to lesser number of uplink component carriers than downlink component carriers. In this case, increasing the PUCCH resources as in second solution may be not possible. Increasing the uplink control head in an uplink component carrier would also mean reducing the resources for uplink data transmission which further reduces the uplink data throughput.

According to this second aspect of the invention, the feedback scheme of the first aspect of the invention is used also in cases where the number of possible feedback sequences of ACK/NACKs for the transmissions is larger than the number of feedback resource combinations available for feedback transmission. This implies that there is no longer a one-to-one mapping between feedback sequences and feedback resource combinations possible, but multiple feedback sequences get mapped to the same feedback resource combination. Feedback sequences that are mapped to one feedback resource combination are also referred as a feedback sequence combination herein. Please note that also this second aspect of the invention is especially applicable for use in a 3GPP LTE-A system operated in FDD mode.

Accordingly, for the entity receiving the feedback (transmitting apparatus), some of the feedback resource combinations will indicate a feedback sequence combinations that are ambiguous with respect to the feedback for at least one transmission—effectively, no feedback for at least one transmission can be derived from the feedback resource combination that is corresponding to a feedback sequence combination. As will be outlined in the following below, the number of ambiguities in the feedback can be reduced to a minimum level.

In a feedback scheme according to the second aspect of the invention, the uplink feedback overhead is reduced when the number of uplink component carriers is less than the downlink feedback component carriers (assuming that the respective transmission are provided on downlink and on respective component carriers, as it may be assumed for example for 3GPP LTE-A). Moreover, in scenarios where the number of uplink component carriers is equal to the number of downlink component carriers, it is possible to utilize fewer resources for uplink control overhead. In turn, this allows increasing the resources for uplink data transmission.

Moreover, the invention allows for using a lower order modulation scheme in comparison to a solution (as discussed above), where the number of states that can be signaled is increased by increasing the number of information bits per modulation symbol, i.e. selecting a higher order modulation scheme. For example, the invention can be operated using a QPSK modulation scheme similar to 3GPP LTE (Release 8). Hence the required transmission power to transmit the uplink feedback is same as in 3GPP LTE. Moreover introducing higher order modulation schemes, such as 8PSK, would have an impact on cell edge user equipments due to higher transmit power requirement. As a consequence there is coverage loss due to higher order modulation to transmit multiple ACK/NACKs signal corresponding to multiple downlink transmission. Thus even if there is a marginal impact on the ACK/NACK information reliability the invention could be beneficial in scenarios indicated above.

Furthermore, another advantage of the feedback scheme according to the first and second aspect of the invention is that states where the receiving apparatus assumes discontinuous transmission can be signalled to the transmitting apparatus. Using the example of 3GPP LTE and 3GPP LTE, when a user equipment is for whatever reason not detecting L1/L2 control information on the PDCCH, the user equipment assumes that no data is transmitted on the downlink, i.e. the user equipment assumes a discontinuous transmission on the respective component carrier. If no PDCCH is received at the user equipment, the user equipment may also not derive a corresponding PUCCH resource for signalling feedback. As indicated above, the index of $1^{st}$ CCE of the one or more CCEs carrying the PDCCH is indicating the PUCCH to be used for feedback transmission by the user equipment. It may be desirable for the eNode B to be informed on which component carrier(s) the user equipment has assumed a discontinuous transmission so as to retransmit the data.

Accordingly, assuming the first aspect of the invention, as long as Equation 1 is true and $J=M \cdot N_r - 2^{N_f} > 0$, J states (i.e. J feedback resource combinations) are not required for the ACK/NACK signaling and may be used to indicate discontinuous transmissions. Depending on how many feedback resource combinations are available for signaling discontinuous transmissions, the user equipment may indicate the component carriers on which a discontinuous transmission has been assumed at different granularities.

When considering the second aspect of the invention, there are no excess states not required for the feedback signaling, i.e. $J=M \cdot N_r - 2^{N_f} \leq 0$. Accordingly, in this case, one or more feedback resource combinations could be allocated for signalling discontinuous transmissions. This would of course imply that the overall reliability of the feedback would be reduced, as e.g. more feedback sequence combinations of need to be defined or the number of feedback sequences in one or more of the feedback sequence combinations needs to be increased, which in turn will have an adverse effect on the reliability of the feedback.

Generally, it may be assumed that there exists a feedback mapping rule in the entity sending the feedback on received transmissions that defines the mapping of the possible feedback sequences of ACK/NACKs to their corresponding feedback resource combination. Similarly, this mapping rule is also known to the entity receiving the feedback that is performing an inverse mapping of a received feedback resource combination to its corresponding feedback sequence or feedback sequence combination.

In order to minimize the ambiguity of a feedback resource combination that is mapped to a feedback resource combination at the entity receiving the feedback resource combination, in one exemplary embodiment of the invention, the feedback mapping rule defines only feedback sequence combinations consisting each of a pair of feedback sequences of ACK/NACKs having a Hamming distance of one to each other (i.e. that deviate from each other in only one position of the two feedback sequences—the Hamming distance between two sequences of equal length is the number of positions at which the two sequences are different). This means that reliable feedback (ACK/NACK) is provided for all but one transmission. Reliable feedback means that the entity receiving the feedback can distinguish or detect, if the transmitted feedback signal for a given transmission is ACK or NACK.

In case the feedback sequence combinations consist each of a pair of feedback sequences of ACK/NACKs the feedback mapping rule need to defines I feedback sequence combinations, where $$I = 2^{N_f} - 2^{log_2 M} \cdot N_r \qquad \text{Equation 2}$$

and where $N_f \geq N_r$. In other words, there are $$K = 2^{log_2 M} \cdot N_r - I \qquad \text{Equation 3}$$

feedback resource combinations that can be unambiguously—i.e. that have a one-to-one mapping—mapped to a corresponding feedback sequence and that provide reliable feedback on all transmissions.

Furthermore, in another exemplary embodiment of the invention, some feedback information may also be inherent to the modulation symbol of the feedback resource combination, independent from the actual reverse link radio resource on which the modulation symbol is signaled. For example, it can be ensured that—according to the mapping rule—the feedback sequences mapped to the same modulation symbol are deviating from each other in the same $\lceil I/M \rceil$ positions ($\lceil x \rceil$ is the ceiling function providing the next higher integer number of x, e.g. $\lceil 2.33 \rceil = 3$). In case I feedback sequence combinations consisting of pairs of feedback sequences that have a Hamming distance of one to each other, it is possible to define these/feedback sequence combinations by pairs of feedback sequences that only deviate from each other in no more than $\lceil I/M \rceil$ positions.

Accordingly, the feedback sequence combinations can be defined such that the remaining $N_f - \lceil I/M \rceil$ positions within respective feedback sequences of a feedback sequence combination do not deviate from each other, which implies that reliable feedback can be provided for the transmissions that are linked to these remaining $N_f - \lceil I/M \rceil$ positions. It is thus possible that the mapping rule provides that the feedback sequences mapped to the same modulation symbol (independent from the actual reverse link radio resource) are identical in $N_f - \lceil I/M \rceil$ positions of the feedback sequences for each respective modulation symbol. Accordingly, when receiving a particular one of the modulation symbols already yields reliable feedback on some transmissions to the entity receiving the feedback.

Similarly, in addition or alternatively to include some inherent feedback information to the modulation symbols of the feedback resource combinations, it is also possible that some feedback information is inherent to the reverse link radio resource of the feedback resource combination. Exemplarily considering that each feedback sequence has $N_f$ positions corresponding each to a respective forward link resource on which a transmission has been received, the feedback mapping rule can ensure that the feedback sequences mapped to the same reverse link radio resource are identical in $N_f-\lceil I/M \rceil$ positions of the feedback sequences for each respective modulation symbol. Accordingly, when receiving feedback on a particular one of the available reverse link radio resources already yields reliable feedback on some transmissions to the entity receiving the feedback.

The examples above show how reliable feedback can be provided on as many transmissions (or component carriers) as possible, i.e. $N_f-\lceil I/M \rceil$ transmissions (or component carriers). This reliability of course at the expense of providing comparably more unreliable feedback on the other transmission corresponding to the remaining $\lceil I/M \rceil$ positions of the feedback sequence, in terms of the number of unreliable feedback sequence combinations for those transmissions being maximum in this case.

In an alternative implementation, it may therefore be considered to not provide reliable feedback on all $N_f-\lceil I/M \rceil$ transmissions. Hence, reliable feedback is only provided on a number of $R<N_f-\lceil I/M \rceil$ of the transmissions. In this exemplary implementation feedback sequences of the respective feedback sequence combinations defined according to the feedback mapping rule do not deviate from each other in the position(s) of the feedback sequences corresponding to the R reliable transmissions. As a result and on average, the number of unreliable feedback sequence combinations for the remaining $N_f-R$ transmission may be reduced in comparison to the previous example.

The transmission(s) on which reliable feedback should be provided may be for example carrying data of a service requiring reliable transmission of service data or low delay in the transmission of the service data.

In another exemplary enhancement of the feedback scheme that can be used alternatively or in combination with the different embodiments of a feedback scheme in accordance with the second aspect of the invention is related to the distribution of unreliable feedback across the different transmissions (e.g. on which no reliable feedback should be provided). If the transmissions are sent on respective component carriers of the communication system, this can be also referred to as distributing the unreliable feedback across the component carriers. As indicated above, feedback on successful or unsuccessful decoding of a respective one of the transmissions is provided at a given position within the feedback sequences. In this exemplary embodiment of the invention it is ensured that the positions in which the individual feedback sequences of the feedback sequence combinations deviate from each other (i.e. the positions of unreliable feedback) are approximately evenly distributed across the transmissions. Approximately means that for some combinations of parameters $N_f$, $N_r$, and M, no uniform distribution may be possible. If possible, however, the feedback resource combinations may be selected to yield for each transmission (or component carrier) the same number of feedback resource combinations providing unreliable feedback for the respective transmission (or component carrier).

As to the first and second aspect of the invention, some further details thereof will be discussed in the following exemplarily referencing to a 3GPP LTE-A (Release 10) system. Although the principles of the first and second aspect of the invention could also be used for uplink transmissions and downlink feedback thereon, the following exemplary embodiments will focus on downlink transmissions and uplink feedback on the transmissions. Furthermore, the transmissions are sent on respective component carriers by the eNode B on the downlink within one sub-frame or transmission time interval using OFDM. The transmissions may include one transport block each and may be sent on the physical downlink shared channel (PDSCH).

In one exemplary implementation, each of the transmissions in the downlink is accompanied by related L1/L2 control signaling on a respective PDCCH in the same sub-frame or transmission time interval. The PDCCH is transmitted by means of one or more so-called Control Channel Elements (CCEs). The L1/L2 control information is indicated to the receiving apparatus, the user equipment, amongst other things, the resource elements and modulation and coding scheme for the corresponding transmission on the PDSCH, and the HARQ protocol related information, e.g. HARQ process number and New Data Indicator (NDI) for the transmission. The transmissions are transmitted using a retransmission protocol supporting incremental redundancy/soft combining, such as HARQ.

Furthermore, in one exemplary embodiment, the uplink radio resources—PUCCH resources—on which HARQ feedback in form of positive acknowledgments (ACKs) and negative acknowledgments (NACKs) is to be sent for the respective downlink transmissions, is linked to the index of the first CCE of the PDCCH of the transmission for which feedback is to be provided. In case of having an asymmetric configuration of component carriers where there are more downlink component carriers than uplink component carriers available to the user equipment, e.g. five downlink component carriers and four uplink component carriers, the PDCCH of the first downlink component carrier may identify the PUCCH resources on the four uplink component carriers. Alternatively the additional PUCCH resources could be signaled by higher layer signaling such as RRC signaling.

Figure 2:
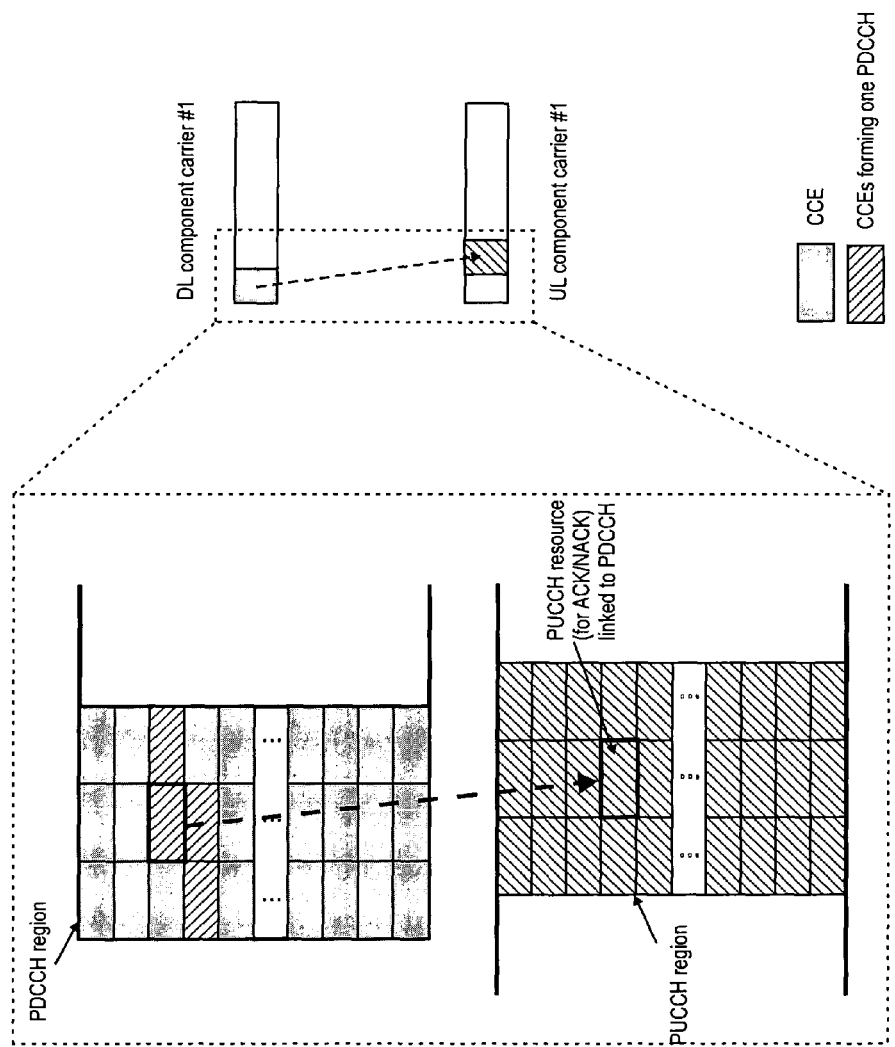
FIG. 2 illustrates the linking between PDCCH resources (CCE) for a transmission and the PUCCH for HARQ feedback yielded by the PDCCH resources.

This is highlighted by FIG. 2. In FIG. 2 it is exemplarily assumed that the PDCCH (i.e. the L1/L2 control information) for a transport block in a given sub-frame is mapped to four Control Channel Elements (CCEs) within the PDCCH region of the sub-frame. The index of the first CCE onto which this PDCCH is mapped is linked to a PUCCH resource in the uplink on which feedback can be provided. The linking between CCE index and the corresponding PUCCH resource could be realized by a given formula taking the CCE index as an input parameter (i.e. the PUCCH index is a function of the PDCCH index–PUCCH index=f(PCDCCH index)+other parameters) or based on some mapping being predefined and known to user equipment and eNode B or being configured by higher layer signaling, such as RRC signaling.

Alternatively the additional PUCCH resource could be signaled by the higher layer signaling.

In the following example, a symmetric configuration of four component carriers in the downlink and uplink is assumed for exemplary purposes. As indicated previously, this means that for $N=N_f=4$ downlink transmissions on the PDSCH, there are $N=N_r=4$ associated uplink resources on the PUCCH on which HARQ feedback can be provided for the transmissions. Each PUCCH resource #n may indicate a resource on a respective uplink component carrier. Note that the $N_r$ uplink resources could be on the same or different uplink component carriers. Furthermore, it is assumed that a QPSK modulation scheme is used for the HARQ feedback on the PUCCH resources. Hence there are M=4 different modulation symbols that can be identified by codewords of $\log_2 4=2$ bits, i.e. $m_1 m_2 \in \{00, 01, 10, 11\}$.

As explained above, this setup is fulfilling the relation as required by Equation 1 above. Thus a one-to-one mapping between possible feedback sequences for the four transmissions and feedback resource combinations is possible, and could for example look like the example shown in the Table 3 below. Please note that the feedback sequence (FS) is a sequence of N=4 positions (respectively bits)–$f_1 f_2 f_3 f_4$. Generally, each position/bit $f_i$ of a feedback sequence is associated to a respective transmission i of the downlink transmissions received by the user equipment, where i=1, . . . , N and indicates whether the respective transmission i could be successfully decoded successfully at the receiving entity (e.g. user equipment), e.g. $f_i$=1 or $f_i$=A, or could not be successfully decoded, e.g. $f_i$=0 or $f_i$=N.

TABLE 3

| Feedback Resource Combination index | Feedback Resource Combination | | Feedback |
|---|---|---|---|
| | PUCCH resource # n | Modulation Symbol (Codeword $m_1 m_2$) | Sequence (FS) $f_1 f_2 f_3 f_4$ |
| 1 | 1 | 00 | AANN |
| 2 | 1 | 01 | ANNA |
| 3 | 1 | 10 | ANNN |
| 4 | 1 | 11 | NNNN |
| 5 | 2 | 00 | AANA |
| 6 | 2 | 01 | NANN |
| 7 | 2 | 10 | NAAA |
| 8 | 2 | 11 | AAAA |
| 9 | 3 | 00 | NNAN |
| 10 | 3 | 01 | ANAN |
| 11 | 3 | 10 | NAAN |
| 12 | 3 | 11 | AAAN |
| 13 | 4 | 00 | NNNA |
| 16 | 4 | 01 | NNAA |
| 15 | 4 | 10 | NANA |
| 16 | 4 | 11 | ANAA |

In the example above, it should be noted that the PUCCH resource of each feedback resource combination also inherently indicates HARQ feedback for at most N−1 transmissions (assuming N=$N_r$=$N_f$). As can be recognized from Table 3, the respective position $f_i$ within a feedback sequence for the corresponding component carrier #i can be selected as an ACK ("A") for all modulation symbols mapped to the PUCCH resource #i yielded by to the component carrier #i (or in more detail the $1^{st}$ CCE of the PDCCH for the transmission thereon), so that a transmission on PUCCH resource #i can be interpreted as an ACK for the transmission on component carrier #i. However, as the feedback sequence indicating only NACKs (e.g. "NNNN") needs to be mapped to one of the feedback resource combinations, no implicit ACK can be defined for all component carriers.

It should be noted that it is also possible to include inherent HARQ feedback to the individual modulation symbols in a similar fashion—see Table 4.

TABLE 4

| Feedback Resource Combination index | Feedback Resource Combination | | Feedback |
|---|---|---|---|
| | PUCCH resource # n | Modulation Symbol (Codeword $m_1 m_2$) | Sequence (FS) $f_1 f_2 f_3 f_4$ |
| 1 | 1 | 00 | AANN |
| 2 | 2 | 00 | ANNA |
| 3 | 3 | 00 | ANNN |
| 4 | 4 | 00 | NNNN |
| 5 | 1 | 01 | AANA |
| 6 | 2 | 01 | NANN |
| 7 | 3 | 01 | NAAA |
| 8 | 4 | 01 | AAAA |
| 9 | 1 | 10 | NNAN |
| 10 | 2 | 10 | ANAN |

TABLE 4-continued

| Feedback Resource Combination index | Feedback Resource Combination | | Feedback |
|---|---|---|---|
| | PUCCH resource # n | Modulation Symbol (Codeword $m_1 m_2$) | Sequence (FS) $f_1 f_2 f_3 f_4$ |
| 11 | 3 | 10 | NAAN |
| 12 | 4 | 10 | AAAN |
| 13 | 1 | 11 | NNNA |
| 16 | 2 | 11 | NNAA |
| 15 | 3 | 11 | NANA |
| 16 | 4 | 11 | ANAA |

Please note that for example for cases where there are only three component carriers configured for downlink and uplink transmission, i.e. there are N=$N_f$=3 downlink transmissions on the PDSCH, Equation 1 yields more available feedback resource combinations than actually required for the HARQ feedback. In this case, the unused J feedback resource combinations could be used for indicating the component carrier (CoCa) or component carriers for which the receiving apparatus (e.g. user equipment) has assumed a discontinuous transmission (DTX). The feedback mapping rule could look like shown in Table 5 below (again assuming a QPSK modulation on the PUCCH resources).

TABLE 5

| Feedback Resource Combination index | Feedback Resource Combination | | Feedback |
|---|---|---|---|
| | PUCCH resource # n | Modulation Symbol (Codeword $m_1 m_2$) | Sequence (FS) $f_1 f_2 f_3$ |
| 0 | 1 | 00 | AAA |
| 1 | 1 | 01 | AAN |
| 2 | 1 | 10 | ANA |
| 3 | 1 | 11 | ANN |
| 4 | 2 | 00 | NAA |
| 5 | 2 | 01 | NAN |
| 6 | 2 | 10 | DTX on CoCa 3 |
| 7 | 2 | 11 | not defined |
| 8 | 3 | 10 | NNA |
| 9 | 3 | 11 | NNN |
| 10 | 3 | 00 | DTX on CoCa 1 |
| 11 | 3 | 01 | DTX on CoCa 2 |

Please note that the indication of assuming a DTX on the component carrier CoCa 3 on the downlink by the user equipment cannot be signaled on PUCCH resource #3, as the user equipment cannot derive the PUCCH resource #3 from the PDCCH for the related transmission on CoCa 3 as same is not received. As seen from the Table 5, "DTX on CoCa 3" is mapped to PUCCH resource #2.

This means that the user equipment is expected to detect the PDCCH on CoCa 2 related to the transmission on CoCa 2 successfully. The decoding of the transmission on the PDSCH could be either successful (ACK) or unsuccessful (NACK). One way for the eNode B for mapping the feedback resource combination "DTX on CoCa 3" back to its meaning is for example "N/DTX, N, DTX", i.e. NACK or DTX on CoCa 1, NACK on CoCa 2 and DTX on CoCa 3. By this way it could be seen that NACK (N) and DTX are not distinguishable for CoCa 1, but it is distinguishable for CoCa 2 and 3. Since CoCa 2 is mapped to NACK ("N") at the eNode B, it means that the reporting user equipment has successfully decoded the PDCCH for the transmission on the PDSCH, but the decoding of the PDSCH was not successful. For CoCa 3, the PDCCH accompanying the transmission was not successfully decoded. Alternatively, the feedback resource combination "DTX on CoCa 3" could also be mapped to "N/DTX, A, DTX" by the eNode B, which allows the eNode B to conclude that on CoCa 2 both PDCCH and PDSCH have been successfully decoded.

Next, in accordance with the second aspect of the invention, an exemplary embodiment of the invention will be discussed, where the relation of Equation 1 is not fulfilled, i.e. the number of possible feedback sequences for the downlink transmissions is larger than the number of feedback resource combinations available for feedback transmission.

In this exemplary embodiment of the invention, a 3GPP LTE-A system is assumed where there are five component carriers in downlink and uplink configured for a user equipment. In this example, it is further assumed that a QPSK modulation is used for the signals sent on the respective PUCCH resources linked to the PDCCHs of the downlink transmissions. To summarize, $N=N_f=N_r=5$ and $M=4$. This means that there are a total number of $2^N=2^5=32$ possible feedback sequences that can result from the five transmissions on downlink, while there are only $M \cdot N = 4 \cdot 5 = 20$ feedback resource combinations available. Accordingly, in line with the second aspect of the invention, some of the feedback sequences will be mapped to a same feedback resource combination. An exemplary feedback mapping is shown in Table 6 below. In this example, it is assumed that maximum two (a pair of) feedback sequences form a so-called feedback sequence combination (FSC) that is mapped to a single feedback resource combination. Furthermore, in the example given in Table 6, the feedback sequences of the respective feedback sequence combinations (see feedback resource combination indices 2, 3, 4, 7, 8, 9, 12, 13, 14, 17, 18 and 19) have a Hamming distance of one. Thus, as can be seen in Table 6 below, even in case a feedback resource combination is linked to a feedback sequence combination, i.e. two feedback sequences in this example, there is unreliable feedback for only one of the transmissions.

TABLE 6

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 0 | 1 | 11 | AAAAA |
| 1 | 2 | 11 | AANNN |
| 2 | 3 | 11 | AANAA |
| | | | AANNA |
| 3 | 4 | 11 | AAAAN |
| | | | AANAN |
| 4 | 5 | 11 | AAANA |
| | | | AAANN |
| 5 | 1 | 10 | ANAAA |
| 6 | 2 | 10 | ANNNN |
| 7 | 3 | 10 | ANNAA |
| | | | ANNNA |
| 8 | 4 | 10 | ANAAN |
| | | | ANNAN |
| 9 | 5 | 10 | ANANA |
| | | | ANANN |
| 10 | 1 | 01 | NAANA |
| | | | NAANN |
| 11 | 2 | 01 | NAAAN |
| | | | NANAN |
| 12 | 3 | 01 | NANAA |
| | | | NANNA |
| 13 | 4 | 01 | NANNN |
| 14 | 5 | 01 | NAAAA |
| 15 | 1 | 00 | NNANA |
| | | | NNANN |
| 16 | 2 | 00 | NNAAN |
| | | | NNNAN |

TABLE 6-continued

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 17 | 3 | 00 | NNNAA |
| | | | NNNNA |
| 18 | 4 | 00 | NNNNN |
| 19 | 5 | 00 | NNAAA |

Generally, it can be seen in the example of Table 6, reliable feedback can be provided for a maximum of $N-\lceil I/M \rceil$ transmissions (i.e. transmissions corresponding to $f_1$ and $f_2$ in the example of Table 6), while for the remaining transmissions (those corresponding to $f_3$, $f_4$ and $f_5$) at least only $M \cdot N - \lceil I/M \rceil = 8$ feedback resource combinations are unambiguously associated to one feedback sequence thereby yielding reliable feedback. Similar to the example shown in Table 4, there is some feedback information inherent to the individual modulation symbol. As can be recognized from the feedback sequences in Table 6, for a respective modulation symbol (indicated by its codeword $m_1 m_2$), the HARQ feedback for at least two transmissions is implicit from the modulation symbol that is signaled. Please note that it is of course also possible to define a mapping, where the feedback on one or more transmissions is inherent to the PUCCH resource used. Hence, even if the modulation symbol on the PUCCH resource carrying the feedback cannot be detected reliably, at least HARQ feedback for this one or more transmissions can be determined by the eNode B from the PUCCH resource used for the feedback transmission.

Another embodiment of the invention is related to the definition of the feedback mapping rule such that for at least one of the component carriers (on which the transmissions are received), the feedback resource combinations having a reverse link radio resource yielded by a respective component carrier (or more accurately the control signaling related to the transmission thereon) have only feedback sequences that acknowledge successful decoding of the transmission on this respective component carrier. Table 7 shows an exemplary mapping of feedback sequences/feedback sequence combinations to their corresponding feedback resource combinations, where for all feedback sequences that are mapped to a given PUCCH resource #n, the position $f_n$ within the feedback sequence that is indicating the feedback (ACK/NACK) for the transmission (PDSCH) on a component carrier the related control signaling (PDCCH) of which is yielding the PUCCH resource #n acknowledge the transmission ("A"—marked in bold for the feedback sequences in Table 7). Please note that this property of the feedback mapping rule may not be ensured for all PUCCH resources, as one feedback resource combination needs to indicate all NACKs (i.e. "NNNNN") for the transmissions. In Table 7, the all NACKs-feedback sequence is mapped to PUCCH resource #2. Hence, this property of the feedback mapping rule can be ensured at best for a maximum of N−1 of the feedback radio resources (assuming $N=N_f=N_r$).

TABLE 7

| Feedback Resource Combination index | Feedback Resource Combination PUCCH resource # n | Modulation Symbol (Codeword $m_1m_2$) | Feedback Sequence (FS) $f_1 f_2 f_3 f_4 f_5$ |
|---|---|---|---|
| 0 | 1 | 00 | ANNNN |
| 1 | 1 | 01 | ANAAA |
| 2 | 1 | 10 | AANNN |
| 3 | 1 | 11 | AAAAA |
| 4 | 2 | 00 | NNNNN |
| 5 | 2 | 01 | NANNN |
| 6 | 2 | 10 | NAAAA |
| 7 | 2 | 11 | AAANA / AAANN |
| 8 | 3 | 00 | NNANA / NNANN |
| 9 | 3 | 01 | NAANA / NAANN |
| 10 | 3 | 10 | ANANA / ANANN |
| 11 | 3 | 11 | NNAAA |
| 12 | 4 | 00 | NNAAN / NNNAN |
| 13 | 4 | 01 | NAAAN / NANAN |
| 14 | 4 | 10 | ANAAN / ANNAN |
| 15 | 4 | 11 | AAAAN / AANAN |
| 16 | 5 | 00 | NNNAA / NNNNA |
| 17 | 5 | 01 | NANAA / NANNA |
| 18 | 5 | 10 | ANNAA / ANNNA |
| 19 | 5 | 11 | AANAA / AANNA |

Additionally, it should be also noted that in the examples given in Table 6 and Table 7, it is further ensured that the unreliable feedback, i.e. the feedback sequence combinations are uniformly distributed so that the same number of feedback resource combinations (FRCs) yield unreliable feedback for the transmissions or component carriers corresponding to $f_3$, $f_4$ and $f_5$. This is exemplified in Table 8 below.

TABLE 8

|  | CoCa $f_1$ | CoCa $f_2$ | CoCa $f_3$ | CoCa $f_4$ | CoCa $f_5$ |
|---|---|---|---|---|---|
| Total ACK/NACKs | 16 | 16 | 16 | 16 | 16 |
| Unreliable ACK/NACKs (unreliable FRC for CoCa) | 0 | 0 | 4 | 4 | 4 |
|  | reliable feedback | | unreliable feedback | | |

Moreover, it should be noted that reliable feedback may be also provided only for less than (N−⌈I/M⌉) transmissions. Generally, the number of transmissions for which reliable feedback is to be provided my be referred to as R, where R≤N−⌈I/M⌉. In the example given above with respect to Table 6 and Table 8, the maximum number of transmission is provided reliable feedback on. This is however increasing the average number of unreliable ACK/NACKs per transmission/component carrier on which unreliable feedback is provided. For example considering the parameterization $N=N_f=N_r=5$ and $M=4$ as above, if $R=1$, then the feedback mapping rule can be chosen such that there is a equal number of unreliable ACK/NACKs, respectively feedback resource combinations per unreliably acknowledged transmission or component carrier, as shown in Table 9.

TABLE 9

|  | CoCa $f_1$ | CoCa $f_2$ | CoCa $f_3$ | CoCa $f_4$ | CoCa $f_5$ |
|---|---|---|---|---|---|
| Total ACK/NACKs | 16 | 16 | 16 | 16 | 16 |
| Unreliable ACK/NACKs (unreliable FRC for CoCa) | 0 | 3 | 3 | 3 | 3 |
|  | reliable feedback | unreliable feedback | | | |

Please note that depending on the number of transmissions, feedback resources and the modulation scheme for the feedback, a uniform distribution of unreliable ACK/NACKs, respectively feedback resource combinations per unreliably acknowledged transmission or component carrier may not be always possible. However, the feedback mapping may be designed so as to come close to a uniform distribution.

Furthermore, in another exemplary embodiment of the invention, the distribution of the feedback resource combinations across the different transmissions may be defined such that reliability classes are generated by non-uniform distribution of feedback sequence combinations. For example, returning to the example of $N=N_f=N_r=5$ and $M=4$, and assuming that each feedback sequence combination comprises a pair of feedback sequences having a Hamming distance of one to each other, the I feedback resource combinations could be distributed across the transmissions such that reliable feedback is provided for transmissions corresponding to $f_1$ and $f_2$, transmissions corresponding to $f_3$ and $f_4$ for a first reliability class, and the transmission corresponding to $f_5$ forms a second reliability class. An example is shown in Table 10.

TABLE 10

|  | CoCa $f_1$ | CoCa $f_2$ | CoCa $f_3$ | CoCa $f_4$ | CoCa $f_5$ |
|---|---|---|---|---|---|
| Total ACK/NACKs | 16 | 16 | 16 | 16 | 16 |
| Unreliable ACK/NACKs (unreliable FRC for CoCa) | 0 | 0 | 3 | 3 | 6 |
|  | reliable feedback | | class 1 unreliable feedback | | class 2 |

The scheduler of the eNode B that is scheduling the downlink transmissions from the eNode B to the user equipment can be assumed to be aware of the feedback mapping rule and thus the reliability class for transmissions on the individual component carriers. The scheduler could exploit this knowledge, for example by scheduling the data of services on the different component carriers based on the knowledge of the reliability class of the feedback thereon. For instance, the scheduler could schedule data of services requiring reliable transmission or low delay in the transmission of the service data on component carriers corresponding to $f_1$ and $f_2$, data of services having less strict quality of service requirements with respect to reliability and delay on component carriers corresponding to $f_3$ and $f_4$. Data of services having a low data rate could be scheduled on the component carrier corresponding to $f_5$ using a low order modulation and coding scheme so as to increase the probability of correct decoding.

Further, it could also be possible that same feedback mapping rule is be applicable to all user equipments. In order to be able to introduce flexibility, a virtual mapping could be used by the user equipments to associate the component carriers to the different positions of the feedback sequence. E.g. a first user equipment could map the HARQ feedback for its component carriers i=[1, . . . , 5] to the feedback sequence $s_4 s_1 s_3$ $s_5 s_2$ (the indices indicate the component carrier for which feedback is provided) using a first virtual mapping, while another user equipment is mapping its component carriers i=[1, . . . , 5] to the feedback sequence $s_1 s_3 s_4 s_5 s_2$ using another virtual mapping, etc. while the feedback mapping rule for all user equipments is referring to the positions of the feedback sequence as $f_1 f_2 f_3 f_4 f_5$ irrespective of the virtual mapping of the individual user equipment.

The number of feedback resource combinations yielding unreliable feedback for a component carrier can also be distributed in a manner suitable to a given target scenario. For example, in Table 10, an example where each of the component carriers corresponding to $f_3$, $f_4$ and $f_5$ have different numbers of unreliable ACK/NACKs is shown in Table 11 below.

TABLE 11

| | CoCa $f_1$ | CoCa $f_2$ | CoCa $f_3$ | CoCa $f_4$ | CoCa $f_5$ |
|---|---|---|---|---|---|
| Total ACK/NACKs | 16 | 16 | 16 | 16 | 16 |
| Unreliable ACK/NACKs (unreliable FRC for CoCa) | 0 | 0 | 2 | 4 | 6 |
| | reliable feedback | | class 1 | class 2 | class 3 |
| | | | | unreliable feedback | |

As already indicated previously, it would be further desirable to be able for the user equipment to indicate to the eNode B that it has assumed a discontinuous transmission (DTX) on one or more of the component carriers configured for downlink transmission and has thus not detected any control and hence data on this/those component carriers within a given sub-frame of the downlink data channel, e.g. the PDSCH in 3GPP LTE and 3GPP LTE-A, or transmission time interval. DTX is typically assumed by a user equipment in case the control signaling accompanying the downlink data transmission is missed or unsuccessfully decoded by the user equipment. For example, in 3GPP LTE and 3GPP LTE-A, this means that the user equipment has not detected or unsuccessfully decoded the PDCCH for a downlink transmission on the PDSCH within the same sub-frame or transmission time interval.

Accordingly, for the single component carrier case, if the downlink control channel resource related to the downlink transmission is linked to the uplink radio resource for HARQ feedback, as explained earlier, the user equipment cannot transmit any feedback on the linked uplink resource as expected by the eNode B, so that the eNode B detects a discontinuous transmission (DTX) on the uplink radio resource(s) where the feedback should have been sent.

It may therefore be desirable for the user equipment to be able to signal to the eNode B that it has missed one or more control channel information of the downlink transmission so as to inform the eNode B thereon. Accordingly the exemplary feedback schemes according to the first and second aspect of the invention may include some enhancements for DTX detection. Hence, as already outlined for the example given with respect to Table 5, for cases where $2^{N_f}<M\cdot N_r$, one or more of the feedback resource combinations may be reserved for indicating the assumption of discontinuous transmission to the transmitting apparatus of the data (e.g. the eNode B) without impact on the reliability of the feedback. However, all other cases, providing feedback on discontinuous transmission(s) means that additional the feedback sequence combination(s) need to be formed in order to be able to reserve one or more feedback resource combinations for signaling discontinuous transmission(s).

Generally, according to the first and second aspect of the invention, in cases where the user equipment is receiving no control signaling for any of the transmission, then the user equipment will not send any feedback, i.e. DTX for the uplink feedback, which can be detected by the eNode B.

If at least one control channel for a downlink transmission is received, there would be generally the possibility to define a feedback resource combination comprising the uplink radio resource for feedback transmission yielded by the received control channel, so that the user equipment could indicate that there have been control channel(s) missed for one or more transmissions—please note that signaling feedback on a feedback resource combination indicates to the eNode B that at least the control channel linked to the uplink radio resource of this feedback resource combination has been received by the user equipment. If choosing the a feedback resource combinations for signaling the discontinuous transmission(s) on the downlink assumed by the user equipment, it needs to be ensured those "DTX-feedback resource combinations" are selected on those uplink radio resources for which a control channel has been received.

Given for example five downlink transmissions/component carriers in the downlink, there is of course a large number of different possible combinations on which component carriers the user equipment has assumed discontinuous transmission(s) and on which it did not. Hence, from a practical point of view, as the reservation of "DTX-feedback resource combinations" means also trading of the reliability of HARQ feedback, the number of "DTX-feedback resource combinations" should be limited to only a few combinations, e.g. 1 to $N_f$ DTX-feedback resource combinations at maximum.

In one example, DTX feedback is enabled for R=1 component carrier that is considered the "anchor component carrier". In case the user equipment is missing a control channel (e.g. PDCCH) for transmissions on this anchor component carrier, this information is important for the eNode B. For example, if a user equipment is repeatedly missing the control channel for the anchor component carrier (i.e. the number of DTX reports is exceeding a threshold), it may consider to reconfigure the component carriers assignment to the user equipment and/or may decide to designate another component carrier on which reliable feedback is to be provided. Accordingly, the at least one feedback resource combination the uplink radio resource of which linked to another component carrier (where the user equipment is expected to have decoded a PDCCH successfully) than the anchor component carrier is reserved for signaling that the user equipment has missed the control channel on the anchor component carrier, i.e. assumed a DTX thereon.

By reconfiguration of the component carriers, the eNode B could try to enhance the possibility of transmission(s) being successful in one of the following ways. In one exemplary implementation, the eNode B could change the reliable component carriers, e.g. component carrier #i to component carrier # j after a given number of DTX reports on component carrier #i. The selection of the new reliable component carrier may for example be based on channel quality feedback, e.g. channel quality indicators (CQIs) reported by the user equipment.

Alternatively, or in addition, the eNode B may also decrease the code rate to improve the overall coding gain of the PDCCHs, which would increase the probability of the PDCCHs being successfully received by the user equipment. Another option, which could be applied in addition the previous measures or alternatively, would be that the eNode B stops using component carrier(s) with frequent DTX detections by the user equipment. Hence, the scheduler of the eNode B may for example not schedule any new transmissions on the component carrier(s) on which the user equipment frequently detects DTX.

In another example, in one embodiment of the invention, there may be R=2 component carriers selected, e.g. component carriers corresponding to $f_1$ and $f_2$ for which DTX detection by the eNode B should be enabled. These component carriers may be for example those on which reliable feedback is to be provided. Accordingly, in this example, there are two feedback resource combinations (one for each of the two component carriers corresponding to $f_1$ and $f_2$) reserved for signaling a discontinuous transmission assumed by the user equipment.

One example for reserving two feedback resource combinations for DTX signaling is shown in Table 12 below. In this example, there are two feedback resource combinations 2 and 5 reserved for signaling a discontinuous transmission on respectively component carriers corresponding to $f_1$ and $f_2$. To compensate for the reserved feedback resource combinations for DTX signaling, there are two additional feedback sequence combinations defined in comparison to the example in Table 7, where no DTX signaling is possible.

TABLE 12

| Feedback Resource Combination index | Feedback Resource Combination | | Feedback |
|---|---|---|---|
| | PUCCH resource # n | Modulation Symbol (Codeword $m_1m_2$) | Sequence (FS) $f_1\,f_2\,f_3\,f_4\,f_5$ |
| 0 | 1 | 00 | ANNNN |
| | | | AANNN |
| 1 | 1 | 01 | ANAAA |
| 2 | 1 | 10 | DTX on CoCa f2 |
| 3 | 1 | 11 | AAAAA |
| 4 | 2 | 00 | NNNNN |
| 5 | 2 | 01 | DTX on CoCa f1 |
| 6 | 2 | 10 | NAAAA |
| 7 | 2 | 11 | AAANA |
| | | | AAANN |
| 8 | 3 | 00 | NNANA |
| | | | NNANN |
| 9 | 3 | 01 | NAANA |
| | | | NAANN |
| 10 | 3 | 10 | ANANA |
| | | | ANANN |
| 11 | 3 | 11 | NNAAA |
| | | | NANNN |
| 12 | 4 | 00 | NNAAN |
| | | | NNNAN |
| 13 | 4 | 01 | NAAAN |
| | | | NANAN |
| 14 | 4 | 10 | ANAAN |
| | | | ANNAN |
| 15 | 4 | 11 | AAAAN |
| | | | AANAN |
| 16 | 5 | 00 | NNNAA |
| | | | NNNNA |
| 17 | 5 | 01 | NANAA |
| | | | NANNA |
| 18 | 5 | 10 | ANNAA |
| | | | ANNNA |
| 19 | 5 | 11 | AANAA |
| | | | AANNA |

In another example, DTX detection for all component carriers is enabled by reserving additional feedback resource combinations as DTX-feedback resource combinations. In Table 13 below, five DTX-feedback combinations are reserved. Further as a consequence there is an increase in maximum number of ACK/NACK combinations within each integrated combination to three. Please note that the maximum Hamming distance of the three feedback sequences combination of a feedback resource combination is two in order to minimize the impact on the HARQ feedback reliability. However the unnecessary retransmission due to unreliable acknowledgement information is only one for each feedback sequence of a feedback sequence combinations.

TABLE 13

| Feedback Resource Combination index | Feedback Resource Combination | | Feedback |
|---|---|---|---|
| | PUCCH resource # n | Modulation Symbol (Codeword $m_1m_2$) | Sequence (FS) $f_1\,f_2\,f_3\,f_4\,f_5$ |
| 0 | 1 | 00 | DTX |
| 1 | 1 | 01 | DTX |
| 2 | 1 | 10 | AANNN |
| | | | ANNNN |
| 3 | 1 | 11 | AAAAA |
| 4 | 2 | 00 | NAAAA |
| 5 | 2 | 01 | NAAAN |
| | | | NAANA |
| | | | NAANN |
| 6 | 2 | 10 | NANAN |
| | | | NANNA |
| | | | NANNN |
| 7 | 2 | 11 | DTX |
| 8 | 3 | 00 | NNANN |
| 9 | 3 | 01 | DTX |
| 10 | 3 | 10 | ANAAN |
| | | | ANANA |
| | | | ANANN |
| 11 | 3 | 11 | AAAAN |
| | | | AAANA |
| | | | AAANN |
| 12 | 4 | 00 | NNAAN |
| | | | NNNAN |
| 13 | 4 | 01 | DTX |
| 14 | 4 | 10 | ANNAN |
| | | | AANAN |
| 15 | 4 | 11 | NNNNN |
| 16 | 5 | 00 | NNANA |
| | | | NNNNA |
| 17 | 5 | 01 | NNAAA |
| | | | NNNAA |
| | | | NANAA |
| 18 | 5 | 10 | ANNNA |
| | | | ANNAA |
| | | | AANNA |
| 19 | 5 | 11 | AANAA |
| | | | ANAAA |

Overall, this example of Table 13 provides for the unreliable ACK/NACK distribution as shown Table 14. In other words, this example can be considered a prioritization of DTX detection over ACK detection reliability, which might not be favorable in all cases—hence as stated previously, the number of combinations used for DTX detection should be kept minimum.

TABLE 14

| | CoCa $f_1$ | CoCa $f_2$ | CoCa $f_3$ | CoCa $f_4$ | CoCa $f_5$ |
|---|---|---|---|---|---|
| Total ACK/NACKs | 16 | 16 | 16 | 16 | 16 |
| Unreliable ACK/NACKs (unreliable FRC for CoCa) | 0 | 5 | 5 | 5 | 4 |
| | reliable feedback | | unreliable feedback | | |

In some of the exemplary embodiments above, the mapping of the feedback sequences and feedback sequence combinations to their corresponding feedback resource combinations has been considering aspects like ensuring that some reliable feedback information is inherent to the feedback resource combinations. For example, in the feedback mapping shown in Table 7, the transmission of feedback on a feedback radio resource (PUCCH/PUCCH) is indicating a positive acknowledgment (ACK) for the transmission in downlink corresponding to the feedback radio resource (expect for the feedback radio resource to which the all-NACK feedback sequence is mapped). In the following, another aspect for designing the feedback mapping rule will be discussed in further detail. According to another embodiment of the invention, the feedback mapping rule is considering the probability of a given number of positive acknowledgements (ACKs) and negative acknowledgements (NACKs) occurring in a feedback sequence.

Generally, it can be assumed that transmission on a component carrier should have a certain target Block Error Rate (BLER). Typically, the BLER is given by a certain percentage that should be met. This means that the scheduler has to select resources, i.e. modulation and coding scheme and/or number of allocated resource blocks and/or transmission power, for the transmissions such that the transmissions have a certain probability of being acknowledged positively (ACK). Typically, neglecting the incorrect detection of feedback signals at the transmitting apparatus and no detection of control signals (PDCCH) carrying information on data transmission at the receiving apparatus for simplicity, one can assume that the probability of a positive acknowledgement for a transmission is given by $P_{ACK}=1-BLER$ and the probability of a negative acknowledgement for a given transmission is $P_{NACK}=1-P_{ACK}=BLER$.

Hence, the probability that a feedback sequence has i positive acknowledgements for a number of N transmissions is $$P_i^N = \binom{N}{i} \cdot (P_{ACK})^i \cdot (P_{NACK})^{N-i} \qquad \text{Equation 4}$$

where $$\binom{N}{i}$$

is the number of feedback sequences that have i positive acknowledgements (ACKs), and the term $(P_{ACK})^i \cdot (P_{NACK})^{N-i}$ is the probability for a feedback sequence that has i positive acknowledgements (ACKs). Please note that $P_i^N$ may also be referred to as the probability of a given number of positive acknowledgements (ACKs) occurring in a feedback sequence.

For simplicity only it will be assumed in the following that the target BLER is identical for all transmissions. If there are N=5 transmissions/component carriers configured for the user equipment and there is a corresponding number of feedback resources available, and assuming a target BLER of 10% for all component carriers, i.e. $P_{ACK}=0.9$ and $P_{NACK}=0.1$, the following results for $P_i^N$ are obtained (see Table 15).

TABLE 15

| | Number of ACKs in a Feedback Sequence | | | | | |
|---|---|---|---|---|---|---|
| i | 5 | 4 | 3 | 2 | 1 | 0 |
| $(P_{ACK})^i \cdot (P_{NACK})^{5-i}$ | 59.05% | 6.56% | 0.73% | 0.08% | 0.0090% | 0.0010% |
| $\binom{N}{i}$ | 1 | 5 | 10 | 10 | 5 | 1 |
| $P_i^5$ | 59.05% | 32.80% | 7.30% | 0.80% | 0.045% | 0.001% |

Please note that the $$\binom{N}{i}$$

feedback sequences that have a given number i positive acknowledgements (ACKs) may be defined as a feedback sequence group. In the example, it is also exemplarily assumed that the scheduler constantly schedules transmissions on all (i.e. five) component carriers.

Please also note that in case BLER is not the same for all component carriers, Equation 4 would need to be updated so as to account for the different probabilities of $P_{ACK}^k$ and $P_{NACK}^k$ given by the respective BLER of the respective component carrier k. For example, the probability of having 4 ACKs in a feedback sequence for 5 transmissions with non-identical target BLER would be:

$$P_4^5 = P_{ACK}^1 \cdot P_{ACK}^2 \cdot P_{ACK}^3 \cdot P_{ACK}^4 \cdot P_{NACK}^5 + \\ P_{ACK}^1 \cdot P_{ACK}^2 \cdot P_{ACK}^3 \cdot P_{NACK}^4 \cdot P_{ACK}^5 + \\ P_{ACK}^1 \cdot P_{ACK}^2 \cdot P_{NACK}^3 \cdot P_{ACK}^4 \cdot P_{ACK}^5 + \\ P_{ACK}^1 \cdot P_{NACK}^2 \cdot P_{ACK}^3 \cdot P_{ACK}^4 \cdot P_{ACK}^5 + \\ P_{NACK}^1 \cdot P_{ACK}^2 \cdot P_{ACK}^3 \cdot P_{ACK}^4 \cdot P_{ACK}^5$$

In one exemplary embodiment of the invention, and assuming Equation 1 to be not fulfilled, the feedback sequences of a feedback sequence group for which the probability $P_i^N$ of a given number i of positive acknowledgements (ACKs) occurring in the feedback sequences of said group is above a threshold probability $P_{threshold}$, i.e. for which $P_i^N > P_{threshold}$, are not comprised to a feedback sequence combination. Hence, this solution allows to ensure that certain feedback sequence groups are acknowledged in a reliable manner, if their probability $P_i^N$ is above a threshold probability $P_{threshold}$.

Alternatively, or in addition to this criterion, the feedback mapping rule could also ensure that overall feedback reliability is higher than a threshold $T_{threshold}$. In one example, $T_{threshold}=90\%$. In another example, $T_{threshold}=99\%$. Hence, in this alternative embodiment, the feedback sequence groups are selected for which the sum of their respective probability $P_i^N$ exceeds the threshold $T_{threshold}$.

For example, considering the results of Table 15, a feedback mapping rule could be designed such that feedback sequences comprising 3, 4 or 5 positive acknowledgments are unambiguously mapped to respective corresponding feedback resource combinations so that reliable feedback is ensured for these feedback sequences with higher $P_i^5$. Feedback sequences comprising 2, 1 or 0 (i.e. no) positive acknowledgment are not signaled reliable, i.e. are comprised to feedback sequence combinations. This could be for example realized by setting $P_{threshold}$ to a value such that $7.30\% < P_{threshold} < 0.8\%$, e.g. $P_{threshold}=5.0\%$ in the above example.

In the exemplary scenario of Table 15, ensuring that feedback sequences comprising 3, 4 or 5 positive acknowledgments are unambiguously mapped to respective corresponding feedback resource combinations this would mean that reliable feedback will be provided with a probability of more than 99% (59.05%+32.80%+7.30%=99.15%). Hence, alternatively, one could obtain the same mapping result by requiring that reliable feedback is provided for at least $T_{threshold}=99\%$ of the transmissions.

If the feedback mapping rule is designed such that feedback sequences comprising 3, 4 or 5 positive acknowledgments are unambiguously mapped to respective corresponding feedback resource combinations, this would also mean that $$S = \binom{5}{5} + \binom{5}{4} + \binom{5}{3} = 16$$

feedback sequences having 5, 4 or 3 positive acknowledgments need to be mapped to an equal number of 16 sequences feedback resource combinations out of the 5·4=20 available feedback resource combinations (assuming a QPSK modulation on the feedback radio resources) in an unambiguous manner (1-to-1 mapping).

Hence, the remaining $$\overline{S} = \binom{5}{2} + \binom{5}{1} + \binom{5}{0} = 16$$

feedback sequences that have 2, 1 or no positive acknowledgment need to be combined in (a maximum of) 4 feedback resource combinations—"in a maximum of" because one or more feedback resource combinations could be optionally reserved for DTX signaling as outlined previously.

One exemplary mapping rule (no DTX signaling) is shown in Table 16. Please note that for feedback resource combination index 11 is associated to a feedback sequence combination that is combining the all NACK feedback sequence (i.e. there is no ACK) and feedback sequences comprising only one ACK. Although the sequences in this combination differ in all five positions of the feedback sequences, there is at maximum one unnecessary retransmission caused by this feedback resource combination.

Alternatively, the combination of the feedback sequences as shown for feedback resource combination index 11 could also be signaled using a DTX of the receiving apparatus when supposed to send the feedback. This would for example allow for reusing the feedback resource combination of feedback resource combination index 11 for signaling another feedback sequence or feedback sequence combination.

Furthermore, it should be noted that the feedback sequence combinations in Table 16 are formed such that feedback sequence having two ACKs are combined to feedback sequence combinations separately, see feedback resource combination indices 3, 7, and 15, while the feedback sequences having one or no ACK are combined in a single feedback resource combination index 11, as mentioned earlier. Furthermore, feedback resource combination indices 3, 7, and 15 are associated to feedback sequence combinations, the feedback sequences of which ensure that each feedback resource combination implies two unnecessary retransmissions of the transmitting apparatus at the maximum. In fact, signaling the feedback resource combination of indices 3 and 7 will only cause one unnecessary retransmission by transmission apparatus.

TABLE 16

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 0 | 1 | 00 | AAAAA |
| 1 | 1 | 01 | AAAAN |

TABLE 16-continued

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 2 | 1 | 10 | AAANA |
| 3 | 1 | 11 | ANNAN |
| | | | ANNNA |
| | | | ANANN |
| | | | AANNN |
| 4 | 2 | 00 | AANAA |
| 5 | 2 | 01 | ANAAA |
| 6 | 2 | 10 | NAAAA |
| 7 | 2 | 11 | NANAN |
| | | | NANNA |
| | | | NAANN |
| 8 | 3 | 00 | AAANN |
| 9 | 3 | 01 | AANAN |
| 10 | 3 | 10 | AANNA |
| 11 | 3 | 11 | NNNNN |
| | | | NNNNA |
| | | | NNNAN |
| | | | NNANN |
| | | | NANNN |
| | | | ANNNN |
| 12 | 4 | 00 | ANANA |
| 13 | 4 | 01 | ANNAA |
| 14 | 4 | 10 | ANAAN |
| 15 | 4 | 11 | NNANA |
| | | | NNAAN |
| | | | NNNAA |
| 16 | 5 | 00 | NAANA |
| 17 | 5 | 01 | NANAA |
| 18 | 5 | 10 | NAAAN |
| 19 | 5 | 11 | NNAAA |

In another exemplary mapping rule that is based on Table 6 above, is shown in Table 17. In this exemplary mapping rule, the feedback sequences of all feedback sequence groups (i.e. feedback sequences comprising two, one and no ACK) are combined in feedback resource combination index 11. This implies that there are up to a maximum of two unnecessary retransmissions when signaling the feedback resource combination corresponding to feedback resource combination index 11. Although the feedback sequences of the feedback sequence combinations of feedback resource indices 3, 7 and 15 differ from each other in three positions, each of the feedback sequence combinations is only implying one unnecessary retransmission.

TABLE 17

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 0 | 1 | 00 | AAAAA |
| 1 | 1 | 01 | AAAAN |
| 2 | 1 | 10 | AAANA |
| 3 | 1 | 11 | ANNAN |
| | | | ANNNA |
| | | | ANANN |
| | | | AANNN |
| 4 | 2 | 00 | AANAA |
| 5 | 2 | 01 | ANAAA |
| 6 | 2 | 10 | NAAAA |
| 7 | 2 | 11 | NANAN |
| | | | NANNA |
| | | | NAANN |
| 8 | 3 | 00 | AAANN |
| 9 | 3 | 01 | AANAN |
| 10 | 3 | 10 | AANNA |

TABLE 17-continued

| Feedback Resource Combination index | Feedback Resource Combination PUCCH resource # n | Modulation Symbol (Codeword $m_1m_2$) | Feedback Sequence (FS) $f_1\ f_2\ f_3\ f_4\ f_5$ |
|---|---|---|---|
| 11 | 3 | 11 | NNNNN |
|  |  |  | NNNAN |
|  |  |  | NNANN |
|  |  |  | NANNN |
|  |  |  | ANNNN |
|  |  |  | NNAAN |
| 12 | 4 | 00 | ANANA |
| 13 | 4 | 01 | ANNAA |
| 14 | 4 | 10 | ANAAN |
| 15 | 4 | 11 | NNANA |
|  |  |  | NNNAA |
|  |  |  | NNNNA |
| 16 | 5 | 00 | NAANA |
| 17 | 5 | 01 | NANAA |
| 18 | 5 | 10 | NAAAN |
| 19 | 5 | 11 | NNAAA |

Considering only the probability of a given number of positive acknowledgements (ACKs) occurring in a feedback sequence in designing a feedback mapping rule may not always be advantageous. For example, embodiments discussed above with respect to Table 15, Table 16 and Table 17 may impose some significant limitation to the scheduler in assigning resources to the scheduled user equipments.

As can be also recognized from Table 16, when having only a low number of feedback sequence combinations to which the feedback sequences of some feedback sequence groups need to be mapped, it is difficult or even impossible to distribute the feedback sequences to those feedback sequence combinations in a manner such that not all feedback is lost. It is important to note that even when a feedback resource combination is mapped to a feedback sequence combination, not all feedback for the transmissions is necessarily lost. For example, in the mapping rules shown in Table 6 and Table 7, reliable feedback for two, respectively one of the five transmissions is provided by most feedback resource combinations that are mapped to a feedback sequence combination.

Generally, assume that there is a total number of Q feedback sequences of one or more feedback sequence groups to be mapped to one feedback sequence combinations, respectively, feedback resource combinations. This means that the minimum number of unreliable ACK/NACKs within the feedback resource combinations $U_{min}$ can be calculated as $$U_{min} = \lceil \log_2 Q \rceil \qquad \text{Equation 5}$$

Please note that $U_{min}$ gives the lower bound of the unreliable "positions" within the feedback sequence combination. For example, for $U_{min}=2$, a maximum of $U_{min}^2=4$ feedback sequences can be mapped (and should be mapped) to a feedback sequence combination. This is of course possible only, if there are four feedback sequences available for combination to this feedback sequence combination that include the combinations [===AA,===AN,===NA,===NN] at two given positions of the N=5 positions of the feedback sequence (i.e. N=5 transmissions or more accurately component carriers configured for the transmissions), where the remaining three positions are identical (as indicated by =). Please note that obviously N is the number of transmissions or more accurately the number of component carriers configured for the transmissions and can have an arbitrary value. Hence, in one exemplary embodiment of the invention, the feedback mapping rule is therefore not only taking into account the probability of a given number of positive acknowledgements (ACKs) occurring in a feedback sequence, but is further designed such that the number of unreliable ACK/NACKs within the feedback resource combinations is minimized. Please note that the optimum distribution of the feedback sequences to feedback sequence combinations may be for example found by computer-aided search.

Please note further that although $U_{min}$ gives the minimum number of unreliable positions for a feedback resource combination, this does not imply that $U_{min}$ is equal to the number of unnecessary retransmission that are caused by the unreliable feedback. Basically, as can be seen in Table 17, it is possible to design the feedback mapping rule such that $U_{min}$ is not reached for a given one (or all) feedback resource combination(s), while still the mapping rule is optimal with respect to the number of unnecessary retransmissions caused. As can be seen from Table 17, if the feedback sequences of a feedback sequence combination comprise only a single ACK in the positions in which the feedback sequences of the feedback sequence combination deviate from each other, it is possible to ensure that there is only one unnecessary retransmission. Hence ideally for $U_{min}=2$, the feedback sequence combinations [===AN, ===NA, ===NN] should be grouped into a feedback sequence combination—if possible—in order to keep the number of unnecessary retransmissions at one.

According to a further embodiment of the invention, the feedback mapping rule is therefore not only taking into account the probability of a given number of positive acknowledgements (ACKs) occurring in a feedback sequence, but is further designed such that the number of unnecessary retransmission by the unreliable feedback (i.e. provided by the signaling of feedback resource combinations associated to respective feedback sequence combinations) is minimized. Please note that the optimum distribution of the feedback sequences to feedback sequence combinations may be for example found by computer-aided search.

According to a further embodiment of the invention, another criterion in selecting the feedback mapping rule that can be optionally considered in addition to the probability of a given number of positive acknowledgements (ACKs) occurring in a feedback sequence is the number of scheduled transmissions. Please note that this criterion may also be considered in combination with a minimization of the number of unnecessary retransmissions or the number of unreliable ACK/NACKs within the feedback resource combinations.

Assuming the example of Table 16 the scheduler would need to assign at least transmissions on three component carriers to a user equipment, in order to ensure a high probability of reliable feedback. In case the scheduler assigns less transmissions on the component carriers, feedback would always be mapped to a feedback resource combination that is associated to a feedback sequence combination, so that there is unreliable feedback for least one or more transmissions.

For example, assume for exemplary purposes that the transmissions on (all) five component carriers are assigned. In this case the possible number of positive acknowledgements in a feedback sequence is 0, 1, 2, 3, 4, or 5 depending on whether or not the transmission on a respective one of the five component carriers is successfully received or not. As can be seen in Table 15, the feedback sequence having five positive acknowledgements (5 ACKs) has the highest probability of occurrence. If transmissions on less than five component carriers are assigned and transmitted from the transmitting apparatus to the receiving apparatus, obtaining a feedback sequence with five positive acknowledgements (ACKs) is not possible. Especially, if there are only transmissions on two downlink component carriers, then the probability of 2 ACKs and 1 ACK within the feedback sequence dominates the performance. Hence it is important for an alternative feedback mapping scheme that takes into account the number of downlink component carriers which are actually used for transmissions (i.e. on which transmissions are scheduled by the scheduler), although the user equipment is configured to receive on five downlink component carriers.

For communication systems that use carrier aggregation, the component carriers may be assigned semi-statically to a user equipment. However downlink assignments may be assumed to be dynamic. Hence, from a scheduling point of view, it is quite likely that the scheduler will not always assign transmission on all configured component carriers to a given user equipment—which means that the user equipment will assume DTX (Discontinued transmission) mode for those component carriers on which no L1/l2 control signaling (PDCCH) is received. Alternatively, the user equipment might be in DRX (Discontinued reception) mode during which user equipment is not required to monitor L1/L2 control signaling (PDCCH) on all component carriers. For example, in 3GPP LTE-A the user equipment is normally configured with multiple component carriers. In this scenario it is likely that there will be at least one anchor component carrier defined for downlink, as explained in previously herein. In case a user equipment is in DRX mode, the user equipment can be expected to monitor for PDCCH only on the anchor component carrier(s). On all other component carriers than the anchor component carrier(s), the user equipment does not need to monitor L1/L2 control signaling. Hence, in an exemplary scenario where one anchor component carrier is defined, feedback sequences having one positive acknowledgement are possible and should be unambiguously mapped to a corresponding uplink feedback resource combination Hence, in order to find an adequate trade-off between scheduler flexibility and feedback reliability, in another embodiment of the invention, the feedback mapping rule is further taking into account the number of transmissions, respectively component carriers configured for the receiving apparatus (e.g. the user equipment) on which transmissions can be scheduled for the receiving apparatus.

Returning to the example, where there are N=5 component carriers configured for transmissions for the user equipment, there is a maximum of five transmissions scheduled/transmitted by the transmitted apparatus. In this example, the number of transmissions is considered in the feedback mapping rule by ensuring that feedback sequences that comprise 3 or 2 positive acknowledgment are transmitted unreliably, i.e. are assigned to feedback sequence combinations, so that at least some more scheduler flexibility is possible, as it may also assign no, one or two transmission to the user equipment within a sub-frame or transmission time interval (that is a scheduling interval). In this manner, the $$S = \binom{5}{5} + \binom{5}{4} + \binom{5}{1} + \binom{5}{0} = 12$$

feedback sequences having either 0, 1, 4 or 5 positive acknowledgments are mapped to respective C=S=12 feedback resource combinations, while the remaining $\overline{C}=N\cdot M-S=5\cdot4-12=8$ feedback resource combinations (again assuming a QPSK modulation for modulation of the feedback for exemplary purposes), need to be mapped to the remaining $$\overline{S} = \binom{5}{3} + \binom{5}{2} = 20$$

feedback sequences having 2 or 3 positive acknowledgments. A possible mapping of feedback sequences and feedback resource combinations according to the above is shown in Table 18.

TABLE 18

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 0 | 1 | 00 | ANNNN |
| 1 | 1 | 01 | AAAAN |
| 2 | 1 | 10 | AANNA |
| | | | AANNN |
| | | | AAANN |
| 3 | 1 | 11 | ANNAA |
| | | | ANNAN |
| | | | ANNNA |
| 4 | 2 | 00 | NANNN |
| 5 | 2 | 01 | AANAA |
| 6 | 2 | 10 | AANAN |
| | | | NAAAN |
| 7 | 2 | 11 | NAANA |
| | | | NAANN |
| 8 | 3 | 00 | NNANN |
| 9 | 3 | 01 | AAANA |
| 10 | 3 | 10 | AAAAA |
| 11 | 3 | 11 | ANAAN |
| | | | ANANA |
| | | | ANANN |
| 12 | 4 | 00 | NNNAN |
| 13 | 4 | 01 | ANAAA |
| 14 | 4 | 10 | NANAA |
| | | | NANAN |
| 15 | 4 | 11 | NNAAN |
| | | | NNAAA |
| | | | NNNAA |
| 16 | 5 | 00 | NNNNA |
| 17 | 5 | 01 | NAAAA |
| 18 | 5 | 10 | NNNNN |
| 19 | 5 | 11 | NANNA |
| | | | NNANA |

As can be recognized from Table 18, feedback resource combination index 11 is associated to a feedback sequence combination in which feedback sequences comprising 2 and 3 ACKs are combined. Hence, in some embodiments of the invention, feedback sequence combinations contain feedback sequences of different feedback sequence groups. Alternatively, it is also possible to preserve feedback sequence group boundaries in the mapping of feedback sequences of feedback sequence groups to the available feedback sequence combinations, respectively feedback resource combinations.

One further exemplary mapping is shown in Table 19, where only feedback sequences of a same feedback sequence group form a feedback sequence combination. Please also note that in this further example, also the number of unnecessary retransmissions could be reduced in comparison to the feedback mapping shown in Table 18.

TABLE 19

| Feedback Resource Combination index | Feedback Resource Combination | | Feedback Sequence (FS) $f_1 f_2 f_3 f_4 f_5$ |
|---|---|---|---|
| | PUCCH resource # n | Modulation Symbol (Codeword $m_1 m_2$) | |
| 0 | 1 | 00 | ANNNN |
| 1 | 1 | 01 | AAAAN |
| 2 | 1 | 10 | NNAAA |
| | | | NANAA |
| | | | ANNAA |
| 3 | 1 | 11 | NAANA |
| | | | NAAAN |
| 4 | 2 | 00 | NANNN |
| 5 | 2 | 01 | AANAA |
| 6 | 2 | 10 | ANANA |

TABLE 19-continued

| Feedback Resource Combination index | Feedback Resource Combination PUCCH resource # n | Modulation Symbol (Codeword $m_1m_2$) | Feedback Sequence (FS) $f_1\ f_2\ f_3\ f_4\ f_5$ |
|---|---|---|---|
| 7 | 2 | 11 | ANAAN<br>AANNA<br>AANAN<br>AAANN |
| 8 | 3 | 00 | NNANN |
| 9 | 3 | 01 | AAANA |
| 10 | 3 | 10 | AAAAA |
| 11 | 3 | 11 | ANNAN<br>ANANN<br>AANNN |
| 12 | 4 | 00 | NNNAN |
| 13 | 4 | 01 | ANAAA |
| 14 | 4 | 10 | NNANA<br>NNAAN |
| 15 | 4 | 11 | NANNA<br>NANAN<br>NAANN |
| 16 | 5 | 00 | NNNNA |
| 17 | 5 | 01 | NAAAA |
| 18 | 5 | 10 | NNNNN |
| 19 | 5 | 11 | NNNAA<br>ANNNA |

Considering the feedback mappings exemplified in Table 18 and Table 19, one would expect—at first sight—that the probability of providing reliable feedback on the transmissions is 59.05%+32.80%+0.045%+0.001%=91.90% (with BLER=10%, assuming five transmissions per sub-frame or transmission time interval, and neglecting incorrect detection of ACK/NACKs at the transmitting apparatus), when it is assumed that the feedback for two or three transmissions in a sub-frame is lost completely. However, as can be seen from the feedback sequence combinations in Table 18 and Table 19, the feedback sequence combinations do not provide completely unreliable feedback. The feedback sequences of feedback resource combination indices 6, 7, 14 and 19 of Table 18 have a Hamming distance of one so that there is unreliable feedback for only one of the transmissions (i.e. Q=2 and $U_{min}$=1). Furthermore, feedback sequences of resource combination indices 2, 3, 11 and 14 differ from each other in only two positions $f_i$ so that they provide unreliable feedback for only two transmissions (i.e. Q=3 and $U_{min}$=2). Hence, the overall feedback reliability is effectively higher than the 91.90% mentioned above. Considering the feedback mapping shown in Table 19, the overall feedback reliability may be effectively even higher, as the number of unnecessary retransmissions is further reduced in comparison to Table 18.

Moreover, it should be noted that for each feedback resource (PUCCH) except for PUCCH resource 5 carrying the all-NACK feedback sequence, a transmission on the feedback resource indicates a positive acknowledgment for the transmission corresponding to the feedback resource, as already explained in some examples above.

In the examples above, the probability of a given number of positive acknowledgements (ACKs) occurring in a feedback sequence and optionally further the number of transmissions, respectively component carriers configured for the receiving apparatus (e.g. the user equipment) on which transmissions can be scheduled for the receiving apparatus have been considered. In these examples it has been assumed that the scheduler always provides N=5 transmissions within a sub-frame when calculating explicit probabilities. As will be outlined below in further detail, the number of transmissions scheduled by the scheduler has a significant impact on the overall reliability of the feedback achieved with the above feedback mapping rules.

This will be exemplified using two exemplary scenarios for the scheduling behavior. In a first scenario (Scenario 1), it is assumed that the scheduler (for example comprised in the transmitting apparatus) is scheduling each number of transmissions (i.e. 1 to N) on an equal basis as shown in Table 20 for the case of having configured N=5 component carriers. Please note that the possibility of having no transmission is excluded for simplicity. Accordingly, each number of transmissions per sub-frame is occurring with a probability of 20% (see Scenario 1). In the second scenario (Scenario 2) shown in Table 20 it is assumed that the scheduler assigns higher number of transmissions more likely than lower number of transmissions.

TABLE 20

| | Number of Transmission per sub-frame/TTI | | | | |
|---|---|---|---|---|---|
| | 5 | 4 | 3 | 2 | 1 |
| Scenario 1 Probability | 20.00% | 20.00% | 20.00% | 20.00% | 20.00% |
| Scenario 2 Probability | 33.33% | 26.67% | 20.00% | 13.33% | 6.67% |

Figure 6:
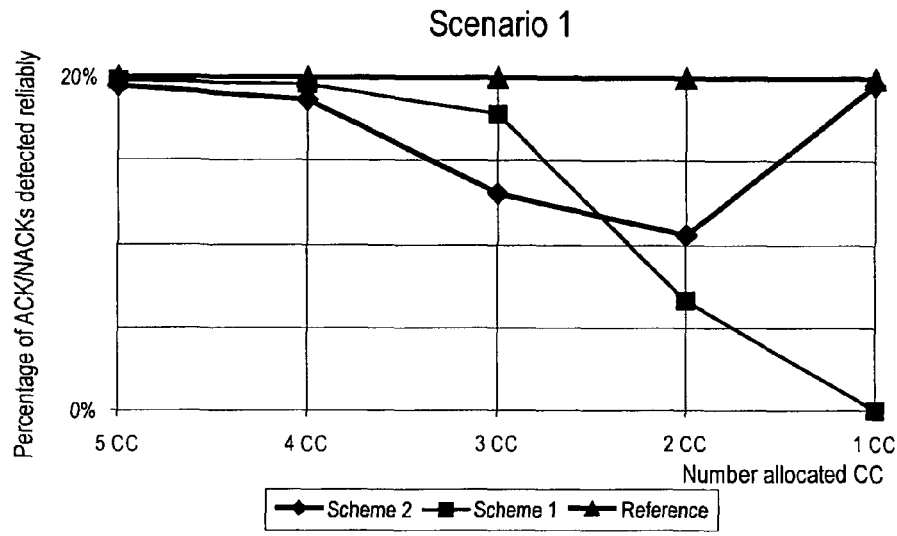
FIGS. 6 and 7 show simulation results of the reliability of feedback in three exemplary scheduling scenarios and for two exemplary feedback mapping schemes according to exemplary embodiments of the invention.
Figure 7:
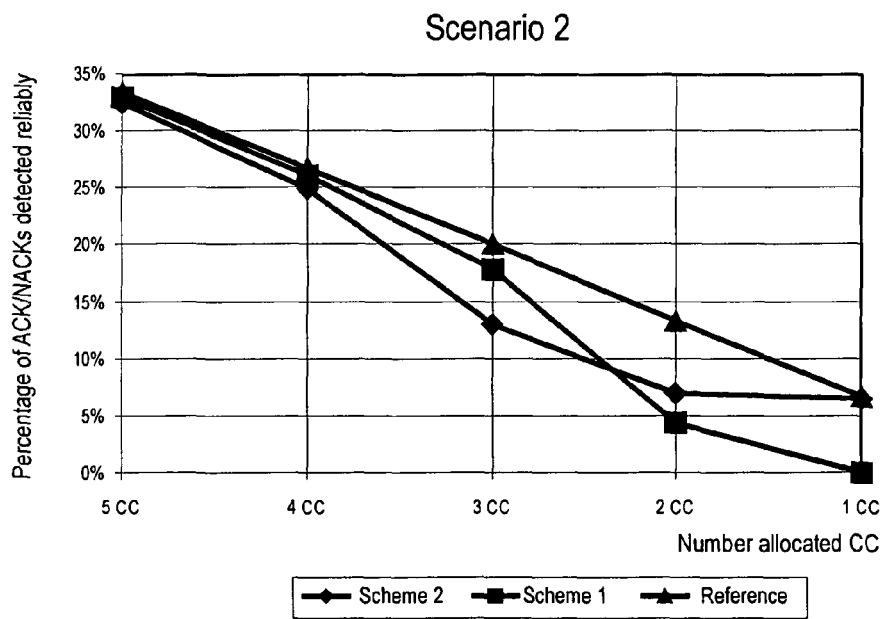

FIG. 6 and FIG. 7 show the simulation results of the reliability of feedback in two exemplary scheduling scenarios (Scenario 1 and Scenario 2 as shown in Table 20) and for three exemplary feedback mapping schemes. Feedback scheme 1 considers only the probability of a given number of positive acknowledgements (ACKs) occurring in a feedback sequence and the second feedback mapping scheme (scheme 2) is a feedback mapping scheme that is further considering the number of assigned transmissions, as discussed previously. The "reference" shown in FIG. 6 and FIG. 7 is referring to employing N times the feedback mapping scheme of 3GPP LTE, i.e. using each feedback resource (PUCCH) yielded by a transmission on the corresponding downlink component carrier as shown in FIG. 1.

As can be seen in FIG. 6, for the first scenario, a feedback mapping scheme 1—an example of which is shown in Table 16—that is considering only the probabilities $P_i^N$ and maps the all feedback sequences of feedback sequence groups which yield a $P_i^N$ that is bigger than a certain threshold $P_{threshold}$ yields a decreasing performance in comparison to the reliable reference feedback scheme of FIG. 1 down to no reliable feedback for one scheduled transmission (i.e. one allocated component carriers (CC)—1CC), if all numbers of transmissions (i.e. each number of allocated component carriers) have an equal probability. The feedback mapping scheme 2—an example of which is shown in Table 18—, where not only the probabilities $P_i^N$ of the feedback sequence groups are considered, but also the number of assigned component carriers, respectively transmissions is considers shows that there is no such worse degrading of the feedback reliability for assignments of 1 one 2 component carriers (i.e. transmissions) in comparison to feedback mapping scheme 1 due to the increased reliability within the feedback sequence combinations that can be provided.

For Scenario 2, where the probability of the number of transmissions is not equal, feedback mapping scheme 1 and feedback mapping scheme 2 provide an approximately equal performance. As feedback mapping scheme 2 is assumed to map feedback sequences of feedback sequence groups having 2 or 3 ACKs to feedback sequence combinations, the performance of feedback mapping scheme 2 is comparably but not significantly lower than that of feedback mapping scheme 1, if three transmissions are scheduled, but is superior if two or only one transmission is scheduled by the scheduler.

Overall, the overall reliability of the two feedback schemes for the two scenarios is summarized in Table 21. Assuming for Scenario 1, feedback scheme 1 provides only an overall reliability of the feedback of 63.90%, while for Scenario 2 its performance is significantly improved. In comparison thereto, feedback scheme 2 is providing a high reliability in both scenarios assumed, so that the overall performance (when averaged) of feedback scheme 2 clearly outperforms feedback scheme 1.

TABLE 21

|  |  | Reference | Scheme 1 | Scheme 2 |
| --- | --- | --- | --- | --- |
| Overall Reliability [%] of the Feedback | Scenario 1 | 100% | 63.90% | 81.25% |
|  | Scenario 2 | 100% | 81.20% | 83.90% |
|  | Average | 100% | 72.55% | 82.57% |

The mapping rules accordingly to the various examples and embodiments described herein that are considering the probability of a given number of positive acknowledgements (ACKs) occurring in a feedback sequence may further be improved to allow DTX signaling as in previous examples described herein. For example, one or more of the feedback resource combinations may be reserved for DTX signaling. An exemplary implementation of a feedback mapping scheme based on the example shown in Table 18 is shown in Table 22 below.

Furthermore, considering the enablement of DTX signaling by the receiving apparatus, a feedback resource combination may be selected for DTX signaling that is associated to a feedback sequence combination. This way the reliability of the feedback sequence groups unambiguously mapped to feedback resource combinations in a 1-to-1 manner is not affected. However, it is also be possible to select a feedback resource combination for the DTX signaling such that one of the feedback sequences of one of feedback sequence groups that should be unambiguously mapped to feedback resource combinations in a 1-to-1 manner is combined with one or more feedback sequences into a feedback sequence combination.

TABLE 22

| Feedback Resource Combination index | Feedback Resource Combination | | Feedback |
| --- | --- | --- | --- |
| | PUCCH resource # n | Modulation Symbol (Codeword $m_1 m_2$) | Sequence (FS) $f_1 f_2 f_3 f_4 f_5$ |
| 0 | 1 | 00 | ANNNN |
| 1 | 1 | 01 | AAAAN |
| 2 | 1 | 10 | AANNA |
| | | | AANNN |
| | | | AAANN |
| 3 | 1 | 11 | ANNAA |
| | | | ANNAN |
| | | | ANNNA |
| 4 | 2 | 00 | NANNN |
| 5 | 2 | 01 | AANAA |
| 6 | 2 | 10 | AANAN |
| | | | NAAAN |
| | | | NANAN |
| 7 | 2 | 11 | NAANA |
| | | | NAANN |
| 8 | 3 | 00 | NNANN |
| 9 | 3 | 01 | AAANA |
| 10 | 3 | 10 | AAAAA |
| 11 | 3 | 11 | ANAAN |
| | | | ANANA |
| | | | ANANN |
| 12 | 4 | 00 | NNNAN |
| 13 | 4 | 01 | ANAAA |
| 14 | 4 | 10 | NANAA |
| | | | NAAAA |
| 15 | 4 | 11 | NNAAN |
| | | | NNAAA |
| | | | NNNAA |
| 16 | 5 | 00 | NNNNA |
| 17 | 5 | 01 | DTX |
| 18 | 5 | 10 | NNNNN |
| 19 | 5 | 11 | NANNA |
| | | | NNANA |

In the example of Table 22, in comparison to Table 18, feedback resource combination index 17 is indicating that the receiving apparatus has assumed a DTX for all component carriers. The feedback sequence "NAAAA" mapped to feedback resource combination index 17 in Table 18, has been combined with feedback sequence "NANAA" within feedback resource combination index 14 of Table 22, so that the ambiguity in the feedback is minimized for feedback sequence "NAAAA". Further, feedback sequence "NANAN" within feedback resource combination index 14 of Table 18, has been integrated with feedback sequences "AANAN" and "NAAAN" within feedback resource combination index 6 of Table 22.

Of course, it is possible to reserve more than one feedback resource combinations (e.g. 2, 3, 4 or 5) for DTX signaling, as exemplified previously herein. In these cases, in one embodiment of the invention, the feedback sequences of feedback sequence groups on which reliable feedback is to be provided should be still mapped unambiguously to respective feedback resource combinations in a 1-to-1 manner.

Moreover, also in all exemplary embodiments related to designing the feedback mapping rule taking into account the probability of a given number of positive acknowledgements (ACKs) occurring in a feedback sequence, the feedback mapping rule may define one or more anchor carriers as discussed previously herein.

For example, in one embodiment of the invention, the feedback mapping rule is designed to enable DTX feedback for R component carrier(s) that is/are considered the anchor component carrier(s). In case the user equipment is missing a control channel (e.g. PDCCH) for transmissions on this anchor component carrier(s), this information is important for the eNode B. For example, if an user equipment is repeatedly missing the control channel for an anchor component carrier (i.e. the number of DTX reports is exceeding a threshold), it may consider to reconfigure the component carriers assignment to the user equipment and/or may decide to designate another component carrier on which reliable feedback is to be provided. Accordingly, the at least one feedback resource combination the uplink radio resource of which linked to another component carrier (where the user equipment is expected to have decoded a PDCCH successfully) than the anchor component carrier is reserved for signaling, that the user equipment has missed the control channel on the anchor component carrier, i.e. assumed a DTX thereon.

Next, the operation of the transmitting apparatus and the receiving apparatus in line with the first and second aspect of the invention will be described with respect to FIG. 4 and FIG. 5. Please note that for exemplary purposes downlink data transmission is considered, so that the transmitting apparatus is corresponding to an eNode B and the receiving apparatus is corresponding to the user equipment. Please also note that the order of steps in FIG. 4 and FIG. 5 is only exemplary and could be changed.

Figure 4:
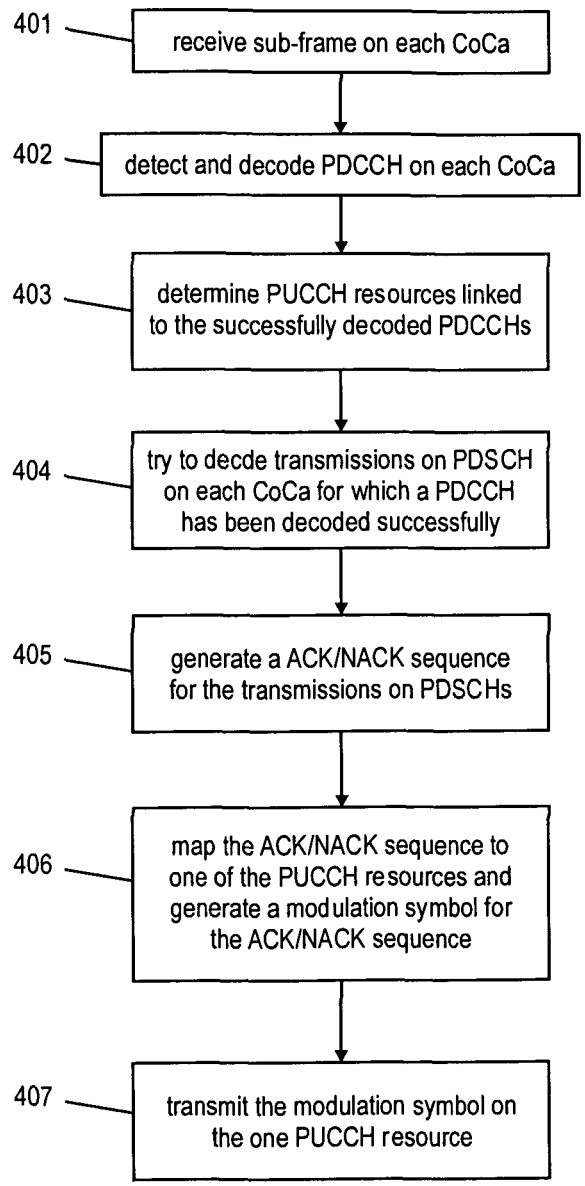
FIG. 4 shows a flow chart of the operation of a user equipment using a feedback scheme according to exemplary embodiment of the invention.
Figure 5:
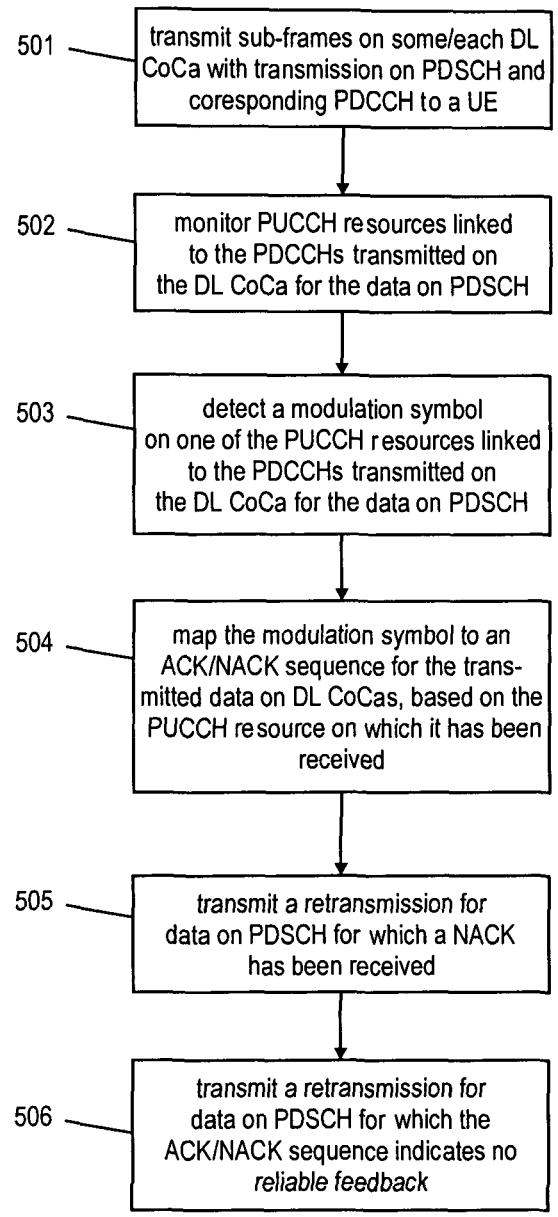
FIG. 5 shows a flow chart of the operation of an eNode B using a feedback scheme according to exemplary embodiment of the invention.

FIG. 4 shows a flow chart of the operation of a user equipment using a feedback scheme according to exemplary embodiment of the invention. The user equipment is configured with a plurality of component carriers in the downlink direction, and may also be assumed to have a corresponding number of uplink component carriers configured. The user equipment receives 401 on each configured component carrier (CoCa) a respective sub-frame and inspects a control channel region thereof. The control channel region is for example corresponding to the first three OFDM symbols of the sub-frame on each component carrier, which carries the PDCCH for the transmission contained in the data part of the sub-frame (PDSCH region).

For exemplary purposes it is assumed that each of the component carriers carries a transmission to the user equipment so that the user equipment detects and tries to decode 402 the control channel (PDCCH) of the sub-frame of each component carrier. The modulation and coding scheme may be either known to the user equipment or alternatively the user equipment could use blind detection of the PDCCHs within the control channel regions of the sub-frames. For successfully decoded PDCCHs, the user equipment may further determine the corresponding PUCCH resources yielded by the PDCCHs. Further, it is also possible that a PDCCH is transmitted on one component carrier and comprises L1/L2 control information on a transmission on another component carrier.

Generally, in praxis, there are of course cases where there is not a transmission for the user equipment on each of the configured component carriers. In this case, the user equipment will not be able to detect a control channel (PDCCH) within the respective sub-frames of the component carriers that do not contain a transmission for the user equipment. Hence in this case, and in cases where the PDCCH is detected but not decoded successfully, the user equipment will consider this as a discontinuous transmission (DTX) on the respective component carrier.

Assuming that the PDCCHs could be decoded successfully, the user equipment will then try to extract the transmissions from the PDSCH region of the respective sub-frames received on the different component carriers and tries 404 to decode the transmissions on the PDSCHs within the respective sub-frames of the component carriers for which a PDCCH has been successfully decoded. The transmissions are transmitted using a HARQ protocol so that the user equipment will generate 405 HARQ feedback in form of ACK/NACK for each transmission. The ACK/NACKs are combined to a feedback sequence. Please note that in case the user equipment could not detect or decode a PDCCH on a given component carrier, it may assume a discontinued transmission for this component carrier. If no DTX reporting is enabled by the utilized HARQ feedback, the user equipment will map the DTX to a NACK for the "transmission" on the respective component carriers. If DTX reporting is enabled, a corresponding indication of the user equipment assuming a discontinued transmission may be signaled with the feedback.

The user equipment may further map 406 the ACK/NACK sequence (feedback sequence) to one of the PUCCH resources (see step 403) and generate a modulation symbol for the ACK/NACK sequence. Please note that this mapping of the feedback sequence may be implemented using any one of the different mapping rules according to the various embodiments described herein. The modulation symbol is then transmitted 407 on the selected PUCCH resource to provide feedback on all transmissions.

FIG. 5 shows a flow chart of the operation of an eNode B using a feedback scheme according to exemplary embodiment of the invention. The eNode B is assumed to send 501 a number of transmissions to the user equipment on the component carriers configured for the given user equipment within individual sub-frames. Each of the transmissions in a sub-frame, respectively component carrier is accompanied by respective L1/L2 control signaling, PDCCH. The transmissions may be transmitted using a HARQ protocol so that the eNode B is awaiting the HARQ feedback for the transmissions. The HARQ feedback resources that can be used by the user equipment for acknowledging the transmissions are linked to the PDCCHs that have accompanied the transmissions. Hence, the eNode B is aware of the candidate feedback radio resources (PUCCHs) that could be used by the user equipment and is monitoring 502 monitor PUCCH resources linked to the PDCCHs transmitted on the downlink component carriers for the transmissions.

The eNode B detects 503 a modulation symbol on one of the PUCCH resources linked to the PDCCHs transmitted on the downlink component carriers for the transmissions and maps 504 the modulation symbol to an ACK/NACK sequence (feedback sequence) for the transmitted data on downlink component carriers, based on the PUCCH resource on which the modulation symbol has been received. For this (reverse) mapping, the eNode B is for example provided with a feedback mapping rule according to the various embodiments described herein. Furthermore, it should be noted that eNode B and user equipment use the same feedback mapping rule.

Having obtained the feedback sequence (or potentially a feedback sequence combination) in step 504, there are different options for the eNode B behavior that are implementation dependent. For example, the eNode B may send 505 retransmissions for those transmissions for which the feedback sequence indicates an unsuccessfully decoding of the transmission, i.e. NACK. The eNode B may send 506 a respective retransmission for those transmissions for which the reverse mapping in step 504 results in a feedback sequence combination, i.e. indicates no reliable feedback for at least one transmission.

Please note that—as outlined in relation to the different embodiments of the invention related to the definition of the feedback mapping rules and their properties—the eNode B may exploit the special properties of the feedback mapping rules on concluding for which transmission(s) the user equipment signaled an ACK, NACK or even DTX and may act accordingly. For example, if there is a DTX report or NACK received at the eNode B for a transmission on a given component carrier, and the eNode B has sent no transmission on the given component carrier, the eNode B could ignore the DTX report or NACK. If there has been a transmission on the given component carrier a retransmission should be sent— see step 505. Likewise, if there number of DTX reports exceeds a certain threshold within a given time frame (e.g. a given number of transmission time intervals or sub-frames) for an "anchor" component carrier, the eNode B may decide to reconfigure the "anchor" component carrier as outlined previously.

In addition to the various examples and embodiments described above, it should be noted that the first and second aspect of the invention may readily be applied to systems where more than five component carriers are aggregated, e.g., 6 component carriers. Furthermore, it should also be noted that it is also possible to integrate more than a pair of feedback sequences into a feedback sequence combination. For example, three or four feedback sequences could be integrated into feedback sequence combinations. If integrating more then two feedback sequences to a feedback sequence combination, the feedback sequences for a feedback sequence combination should be chosen so as to yield the smallest Hamming distance between the feedback sequences possible in order to reduce the number of unreliable acknowledgements per feedback sequence combination. For example, the Hamming distance for three, respectively four feedback sequences of a feedback sequence combination could be two. However the unnecessary retransmission due to unreliable acknowledgement information is more than one for each feedback sequence of a feedback sequence combinations.

Furthermore, it should be further noted that in most of the examples given above with respect to the various tables herein, the feedback sequences of all feedback sequence combinations have the same properties, such as for example a given Hamming distance of the feedback sequences of each feedback sequence combination, a given number of feedback sequences per feedback sequence combination, etc. In a further embodiment different sets of feedback sequence combinations are defined that have different properties. One example for such embodiment is shown in Table 13, where a first set of feedback sequence combinations could be defined for the feedback sequence combinations having a pair of feedback sequences with Hamming distance 1 to each other, while a second set of feedback sequence combinations could be defined by the feedback sequence combinations having three feedback sequence combinations and having a maximum Hamming distance of 2.

It should be further noted that in—in line with another embodiment of the invention—there may also be individual feedback sequence combination(s) defined by the feedback mapping rule that do not have any special property/properties, while the remaining feedback sequence combinations exhibit properties, like a given number of feedback sequences per feedback sequence combination and/or a given Hamming distance among the feedback sequences of a feedback sequence combination.

Moreover, the feedback mapping rule may be for example predefined in the communication system. Alternatively or additionally, the feedback mapping rule may be configured/reconfigured by the eNode B by means of control layer signaling, such as Radio Resource Control signaling.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for providing by a receiving apparatus feedback on plural transmissions on respective plural component carriers to a transmitting apparatus in a communication system using carrier aggregation, the method comprising the following steps performed by said receiving apparatus:
receiving said plural transmissions on said respective plural component carriers from the transmitting apparatus, and
determining for each transmission of said plural received transmissions, whether the respective transmission could be decoded successfully, thereby generating a feedback sequence of ACK/NACKs for the plural transmissions,
transmitting the feedback sequence on one feedback resource combination corresponding to the feedback sequence, wherein
the one feedback resource combination is determined from plural feedback resource combinations, and the feedback resource combinations define distinct combinations of:
one of a plurality of reverse link radio resources available for transmitting the feedback sequence, and
a modulation symbol of a modulation scheme to be transmitted on said one reverse link radio resource.

2. The method according to claim 1, wherein the number of possible feedback sequences of ACK/NACKs for said plural transmissions is larger than the number of feedback resource combinations available for feedback transmission.

3. The method according to claim 1, further comprising the step of providing a feedback mapping rule that defines the mapping of each feedback sequence of ACK/NACKs possible for said plural transmissions to its corresponding feedback resource combination, wherein the feedback mapping rule considers the probability of a given number of positive and negative acknowledgements occurring in a feedback sequence, in such manner that the feedback sequences of a feedback sequence group for which the probability of a given number of positive acknowledgements occurring in the feedback sequences of said group is above a threshold probability, are not comprised in the feedback sequence combination.

4. The method according to claim 3, wherein the feedback mapping rule considers the probability of a scheduler scheduling a given number of transmissions within a sub-frame.

5. The method according to claim 3, wherein the possible feedback sequences of ACK/NACKs are grouped into feedback sequence groups, wherein each feedback sequence group consists of feedback sequences having a given number of number of positive acknowledgements ACKs occurring in a feedback sequence, and
wherein according to the feedback mapping rule, only feedback sequences of selected one or more feedback sequence groups are mapped to the feedback sequence combinations, whereas the remaining feedback sequences are not mapped to the feedback sequence combinations.

6. The method according to claim 5, wherein said feedback sequences of said selected one or more feedback sequence groups are mapped to the feedback sequence combinations such that the number of ambiguous ACK/NACKs per feedback resource combination or the number of unnecessary retransmissions implied by the feedback sequence combinations is minimized.

7. The method according to claim 5, wherein said feedback sequences of said selected one or more feedback sequence groups are mapped to the feedback sequence combinations
such that the total number of ambiguous ACK/NACKs of all feedback resource combinations defined by the feedback mapping rule is minimized, or
such that the number of unnecessary retransmissions implied by the feedback sequence combinations of all feedback resource combinations defined by the feedback mapping rule is minimized.

8. The method according to claim 4, wherein the feedback sequence comprising only negative acknowledgements and/or the feedback sequences comprising only one positive acknowledgement is/are unambiguously mapped to respective feedback resource combinations.

9. The method according to claim 1, further comprising the step of providing a feedback mapping rule that defines the mapping of each feedback sequence of ACK/NACKs possible for said plural transmissions to its corresponding feedback resource combination.

10. The method according to claim 9, wherein the feedback mapping rule defines feedback sequence combinations consisting each of at least two/a pair of feedback sequences of ACK/NACKs having a Hamming distance of one to each other, and
wherein a respective feedback sequence combination is mapped to one of the feedback resource combinations.

11. The method according to claim 10, wherein each of the feedback sequence combinations consists of a pair of feedback sequences of ACK/NACKs having a Hamming distance of one to each other, and wherein there are M different modulation symbols corresponding to the modulation scheme for feedback transmission, $N_f$ forward link radio resources on which the plural transmissions are received respectively, and $N_r$ reverse link radio resources available for transmitting the feedback sequence, and the feedback mapping rule defines I feedback sequence combinations, where $$I = 2^{N_f} - 2^{\log_2 M} \cdot N_r$$

and where $$N_f \geq N_r$$

12. The method according to one of claim 11, wherein each feedback sequence has $N_f$ positions corresponding each to a respective forward link resource on which a transmission has been received, and according to the mapping rule, the feedback sequences mapped to the same modulation symbol are deviating from each other in the same $\lceil I/M \rceil$ positions, and/or
wherein each feedback sequence has $N_f$ positions corresponding each to a respective forward link resource on which a transmission has been received, and according to the mapping rule, the feedback sequences mapped to the same modulation symbol are identical in $N_f - \lceil I/M \rceil$ positions of the feedback sequences for each respective modulation symbol, and/or
wherein each feedback sequence has $N_f$ positions corresponding each to a respective forward link resource on which a transmission has been received, and according to the mapping rule, the feedback sequences mapped to the same reverse link radio resource are identical in $N_f - \lceil I/M \rceil$ positions of the feedback sequences for each respective modulation symbol.

13. The method according to claim 10, wherein feedback on successful or unsuccessful decoding of a respective one of the transmissions is provided at a given position within the feedback sequences, and the positions in which the individual feedback sequences of the feedback sequence combinations deviate from each other are approximately evenly distributed across the transmissions.

14. The method according to claim 2, wherein an integer number R of the plural transmissions are selected on which unambiguous feedback is to be provided, and the feedback sequences of the respective feedback sequence combinations defined according to the feedback mapping rule do not deviate from each other in the position(s) of the feedback sequences corresponding to the R reliable transmissions.

15. The method according to claim 2, wherein for at least one of the component carriers on which the transmissions are received, the feedback resource combinations having a reverse link radio resource that is yielded by one of said at least one component carriers further have only feedback sequences that acknowledge successful decoding of the transmission on said one of said at least one component carriers.

16. A method for receiving by a transmitting apparatus feedback on plural transmissions on respective plural component carriers from a receiving apparatus in a communication system using carrier aggregation, the method comprising the following steps performed by said transmitting apparatus:
transmitting said plural transmissions on said respective plural component carriers on plural forward link radio resources to the receiving apparatus,
determining on which one of plural feedback resource combinations feedback on the transmissions is provided from the receiving apparatus, wherein the feedback resource combinations are distinct combinations of:
one of plural reverse link radio resources available for receiving feedback on the transmissions from the receiving apparatus, and
one modulation symbol of a modulation scheme received on said one reverse link radio resource, and
mapping the detected feedback resource combination to a corresponding feedback sequence of ACK/NACKs indicating which of the transmissions could be decoded successfully.

17. The method according to claim 16, wherein the number of feedback resource combinations available for feedback transmission is smaller than number of possible feedback sequences of ACK/NACKs for said plural transmissions.

18. The method according to claim 17, wherein the detected feedback resource combination cannot be unambiguously mapped to a corresponding feedback sequence of ACK/NACKs, so that for one single transmission of the said transmissions no feedback on its successful decoding can be determined by the transmitting apparatus.

19. The method according to claim 1, wherein at least one of the feedback resource combinations is reserved for signalling from the receiving apparatus to the transmitting apparatus that no control signalling for at least one but not all of the transmissions has been received, so that the respective transmission(s) have not been received by the receiving apparatus due to same assuming a discontinuous transmission (DTX).

20. A receiving apparatus for providing feedback on plural transmissions on respective plural component carriers to a transmitter in a communication system using carrier aggregation, the receiving apparatus comprising:
- a receiver for receiving said plural transmissions on said respective plural component carriers from the transmitter,
- a processing unit for determining for each transmission of said received plural transmissions, whether the respective transmission could be decoded successfully, thereby generating a feedback sequence of ACK/NACKs for the plural transmissions,
- a transmitter for transmitting the feedback sequence on one feedback resource combination corresponding to the feedback sequence, wherein
- the one feedback resource combination is determined from plural feedback resource combinations, wherein the feedback resource combinations define distinct combinations of:
  - one of a plurality of reverse link radio resources available for transmitting the feedback sequence, and
  - a modulation symbol of a modulation scheme to be transmitted on said one reverse link radio resource.

21. A transmitting apparatus for receiving feedback on plural transmissions on respective plural component carriers from a receiving apparatus in a communication system using carrier aggregation, the transmitting apparatus comprising:
- a transmitter for transmitting said plural transmissions on said respective plural component carriers on plural forward link radio resources to the receiving apparatus,
- a processing unit for determining on which one of plural feedback resource combinations feedback on the transmissions is provided from the receiving apparatus, wherein the feedback resource combinations are distinct combinations of:
  - one of plural reverse link radio resources available for receiving feedback on the transmissions from the receiving apparatus, and
  - one modulation symbol of a modulation scheme received on said one reverse link radio resource, and
- a mapping unit for mapping the detected feedback resource combination to a corresponding feedback sequence of ACK/NACKs indicating which of the transmissions could be decoded successfully.

* * * * *